(12) United States Patent
Kishi et al.

(10) Patent No.: US 11,493,402 B2
(45) Date of Patent: Nov. 8, 2022

(54) PRESSURE SENSOR FOR EVAPORATED FUEL LEAK DETECTOR

(71) Applicant: DENSO CORPORATION, Kariya (JP)

(72) Inventors: Ryoyuu Kishi, Kariya (JP); Yasuo Katoh, Kariya (JP); Tomohiro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 17/215,725

(22) Filed: Mar. 29, 2021

(65) Prior Publication Data
US 2021/0302265 A1 Sep. 30, 2021

(30) Foreign Application Priority Data
Mar. 31, 2020 (JP) .............................. JP2020-063419

(51) Int. Cl.
*G01M 3/32* (2006.01)

(52) U.S. Cl.
CPC ................................ *G01M 3/3209* (2013.01)

(58) Field of Classification Search
CPC .... G01M 3/26; G01M 3/3263; G01M 3/2815; G01M 3/3272; G01M 3/3209; F02M 25/0818; F02M 25/0872; F02M 2025/0845; F02M 25/0809; F02M 25/089; F02M 25/0836; G01L 19/0672; G01L 19/147; G01L 19/14; G01L 19/141; G01L 9/06; G01L 19/0627; F02D 41/22; F02D 2041/225

See application file for complete search history.

(56) References Cited

U.S. PATENT DOCUMENTS

| | | | | |
|---|---|---|---|---|
| 5,604,372 A | * | 2/1997 | Yamaguchi | ......... G01L 19/0084 257/787 |
| 2004/0000187 A1 | | 1/2004 | Kobayashi et al. | |
| 2015/0252756 A1 | | 9/2015 | Itoh et al. | |

FOREIGN PATENT DOCUMENTS

JP         2006084339 A  *  3/2006

OTHER PUBLICATIONS

U.S. Appl. No. 17/215,702 to Kishi et al., entitled "Pressure Sensor for Evaporated Fuel Leak Detector", filed Mar. 29, 2021 (46 pgs.).

(Continued)

*Primary Examiner* — John Fitzgerald
*Assistant Examiner* — Truong D Phan
(74) *Attorney, Agent, or Firm* — Nixon & Vanderhye P.C.

(57) ABSTRACT

A pressure sensor for an evaporated fuel leak detector includes a sensor unit, a case, and a sealing resin. The sensor unit has a pressure receiving portion, a plurality of conduction terminals, and a mold resin portion. The case has a fluid flow path and a housing recess. Each remaining inner wall surface of the housing recess except for an inner wall surface on the conduction terminal side is provided with an inclined surface and a vertical surface, in a cross section along an axial direction perpendicular to a pressure receiving surface of the sensor unit. The inclined surface is inclined inward as toward a pressure receiving side. The vertical surface extends from the end of the inclined surface on the pressure receiving side to define a filling gap in which the sealing resin is filled between the side surface of the mold resin portion and the vertical surface.

3 Claims, 18 Drawing Sheets

(56) References Cited

OTHER PUBLICATIONS

U.S. Appl. No. 17/215,667 to Kishi et al., entitled "Pressure Sensor for Evaporated Fuel Leak Detector", filed Mar. 29, 2021 (47 pgs.).
U.S. Appl. No. 17/215,781 to Kishi et al., entitled "Pressure Sensor for Evaporated Fuel Leak Detector", filed Mar. 29, 2021 (47 pgs).

\* cited by examiner

PRESSURE SENSOR FOR EVAPORATED FUEL LEAK DETECTOR

CROSS REFERENCE TO RELATED APPLICATION

The application is based on a Japanese Patent Application No. 2020-063419 filed on Mar. 31, 2020, the contents of which are incorporated herein by reference in its entirety.

TECHNICAL FIELD

The present disclosure relates to a pressure sensor for an evaporated fuel leak detector.

BACKGROUND

In a vehicle having an internal combustion engine, a hydrocarbon fuel such as gasoline, high octane, and light oil used as a liquid fuel in the internal combustion engine is stored in a fuel tank. Evaporated fuel is generated in the fuel tank. In order not to release the evaporated fuel to the outside, an evaporative fuel processing device having a canister capable of adsorbing the evaporated fuel is used.

SUMMARY

According to an exemplar of the present disclosure, a pressure sensor is for an evaporated fuel leak detector configured to detect a leak of an evaporated fuel in an evaporative fuel processing device including a fuel tank and a canister for adsorbing an evaporated fuel discharged from the fuel tank. The pressure sensor includes a sensor unit, a case and a sealing resin. The sensor unit includes a pressure receiving portion configured to detect a pressure of a fluid applied to a pressure receiving surface, a plurality of conductive terminals provided at the pressure receiving portion and made of a conductive material, and a mold resin portion that covers an outer surface of the pressure receiving portion except for the pressure receiving surface. The case is provided with a fluid flow path through which the fluid is introduced to the pressure receiving surface, and a housing recess housing the sensor unit therein and connected to the fluid flow path. The sealing resin is filled in the housing recess in which the sensor unit is housed, to cover a surface of the mold resin portion arranged in the housing recess. The case has an annular inner wall surface defining the housing recess and surrounding a side surface of the mold resin portion, and the annular inner wall surface of the case includes a first inner wall surface on a conductive terminal side where a plurality of conductive terminals are arranged and a plurality of second inner wall surfaces intersecting each other.

When a direction of the housing recess where the pressure receiving surface is arranged to expose from the housing recess is a pressure receiving side and a direction opposite to the pressure receiving side of the housing recess is a back side, the second inner wall surface has an inclined surface inclined inward as toward the pressure receiving side, and a vertical surface adjacent to the pressure receiving side of the inclined surface and extending in a direction perpendicular to the pressure receiving surface to define a gap filled with the sealing resin between the side surface of the mold resin portion and the vertical surface, in a cross section along the direction perpendicular to the pressure receiving surface.

In the pressure sensor of the evaporated fuel leak detector according to the exemplar, the sealing resin filled in the housing recess covers the surface of the mold resin portion arranged in the housing recess. With this configuration, it is difficult for electromagnetic noises or heat generated from the motor of the pressure reducing pump and the solenoid noise of the solenoid valve arranged around the pressure sensor of the decompression leak check module, to reach to the sensor unit from the back side of the sensor unit.

Due to this structure of the sealing resin, when the pressure sensor is heated, the thermal stress applied from the sealing resin to the pressure receiving portion of the sensor unit becomes more uniform. Therefore, the pressure detection of the pressure receiving portion is less affected by the thermal stress.

Thus, according to the pressure sensor of the evaporated fuel leak detector of the exemplar, an error of the pressure detection can be reduced, and the pressure detection accuracy can be improved.

BRIEF DESCRIPTION OF THE DRAWINGS

The above and other objects, features and advantages of the present disclosure will be more clearly understood from the following detailed description with reference to the accompanying drawings. In which.

DESCRIPTION OF EMBODIMENTS

Figure 1:
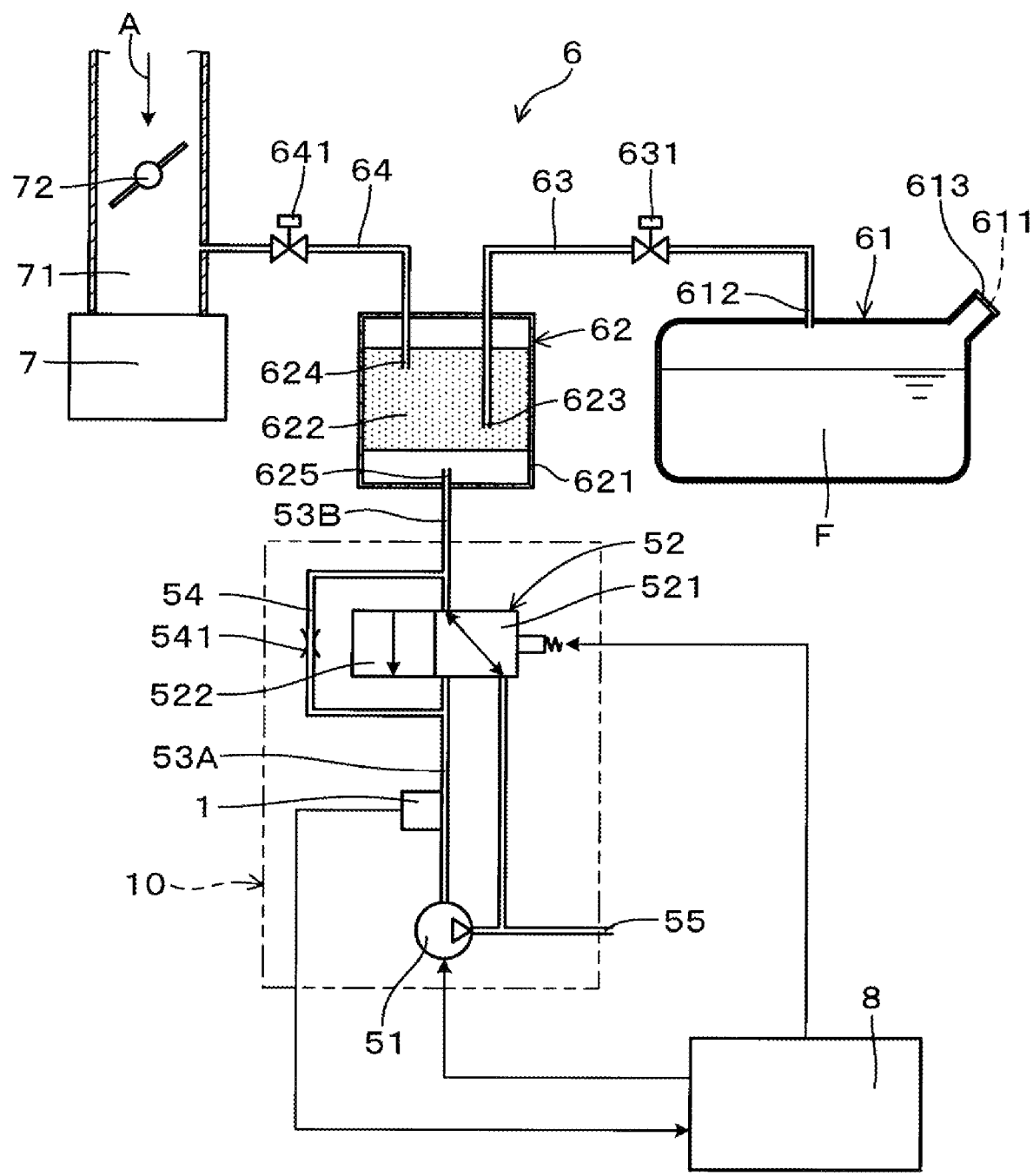
FIG. 1 is a diagram showing a configuration of a decompression leak check module using a pressure sensor and an evaporative fuel processing device according to a first embodiment.

In an evaporative fuel processing device, an evaporated fuel leak detector for checking an airtightness of the fuel tank and the canister is used. The evaporated fuel leak detector is provided with: a pressure reducing pump for decompressing the inside of the fuel tank and the inside of the canister; a solenoid valve configured to switch connection of the gas phase of the canister to the atmosphere or the pressure reducing pump; and a pressure sensor disposed in a first pipe between the pressure reducing pump and the solenoid valve to detect the pressure in the first pipe, pressure-reduced by the pressure reducing pump.

Further, a bypass pipe is connected to the first pipe and a second pipe between the canister and the solenoid valve to bypass the solenoid valve, so that a predetermined leakage state is formed by an orifice provided in the bypass pipe. Then, it is determined whether or not a leakage of the fuel tank and the canister is generated based on the leakage state from the orifice provided in the bypass pipe.

The pressure sensor includes a sensor unit having a pressure receiving portion, a case in which a housing recess for accommodating a fluid flow path of the first pipe and the sensor unit is formed, and a sealing resin arranged in a gap of the housing recess in which the sensor unit is accommodated. The sensor unit is fixed to the housing recess and the periphery of the sensor unit is sealed by the sealing resin, so that the pressure applied from the fluid flow path to a pressure receiving surface of a pressure receiving portion of the sensor unit is detected. The pressure receiving portion of the sensor unit converts the pressure applied to the pressure receiving surface into strain, and a voltage change caused by the strain is detected.

Because the sealing resin arranged in the housing recess is made to fix the sensor unit to the case, the sealing resin is not arranged up to the back side of the sensor unit located on an opposite side of the pressure receiving surface of the pressure receiving portion. Further, in the pressure sensor, in order to guide the arrangement of the sensor unit into the housing recess and facilitate the injection of the sealing resin into the housing recess, an inclined surface is formed in the inner wall surface of the housing recess up to a position facing a side surface of the sensor unit. The housing recess is filled with a sealing resin along the inclined surface of the hosing recess, and the thickness of the filled resin facing the side surface of the sensor unit becomes thinner as toward the direction of the pressure receiving surface of the pressure receiving portion, that is, as toward the bottom side of the housing recess.

Due to this structure of the sealing resin, when the pressure sensor is heated or cooled, the thermal stress applied from the sealing resin to the sensor unit increases as the thickness of the sealing resin increases. Because the thermal stress applied to the sensor unit from the sealing resin is non-uniform, the sensor unit may be deformed non-uniformly, and stress is also generated in the pressure receiving portion, so that an error is likely to occur in pressure detection of the pressure sensor.

The present disclosure has been made in view of the above matter, and is to provide a pressure sensor for an evaporated fuel leak detector, in which an error in pressure detection can be effectively reduced.

According to an embodiment of the present disclosure, a pressure sensor is for an evaporated fuel leak detector configured to detect a leak of an evaporated fuel in an evaporative fuel processing device including a fuel tank and a canister for adsorbing an evaporated fuel discharged from the fuel tank. The pressure sensor includes a sensor unit, a case and a sealing resin. The sensor unit includes a pressure receiving portion configured to detect a pressure of a fluid applied to a pressure receiving surface, a plurality of conductive terminals provided at the pressure receiving portion and made of a conductive material, and a mold resin portion that covers an outer surface of the pressure receiving portion except for the pressure receiving surface. The case is provided with a fluid flow path through which the fluid is introduced to the pressure receiving surface, and a housing recess housing the sensor unit therein and connected to the fluid flow path. The sealing resin is filled in the housing recess in which the sensor unit is housed, to cover a surface of the mold resin portion arranged in the housing recess. The case has an annular inner wall surface defining the housing recess and surrounding a side surface of the mold resin portion, and the annular inner wall surface of the case includes a first inner wall surface on a conductive terminal side where a plurality of conductive terminals are arranged and a plurality of second inner wall surfaces intersecting each other.

When a direction of the housing recess where the pressure receiving surface is arranged to expose from the housing recess is a pressure receiving side and a direction opposite to the pressure receiving side of the housing recess is a back side, the second inner wall surface has an inclined surface inclined inward as toward the pressure receiving side, and a vertical surface adjacent to the pressure receiving side of the inclined surface and extending in a direction perpendicular to the pressure receiving surface to define a gap filled with the sealing resin between the side surface of the mold resin portion and the vertical surface, in a cross section along the direction perpendicular to the pressure receiving surface.

In the pressure sensor of the evaporated fuel leak detector according to the exemplar, the sealing resin filled in the housing recess covers the surface of the mold resin portion arranged in the housing recess. With this configuration, it is difficult for electromagnetic noises or heat generated from the motor of the pressure reducing pump and the solenoid noise of the solenoid valve arranged around the pressure sensor of the decompression leak check module, to reach to the sensor unit from the back side of the sensor unit.

Each second inner wall surface of the housing recess of the present exemplar is provided with the inclined surface and the vertical surface, in the cross section along the axial direction L perpendicular to the pressure receiving surface. The inclined surface is inclined inward as toward the pressure receiving side. The vertical surface extends from the end of the pressure receiving side of the inclined surface to define the filling gap in which the sealing resin is filled between the side surface of the mold resin portion and the vertical surface. With this configuration, the thickness of the sealing resin filled in the filling gap between the side surface of the mold resin portion and the vertical surface of the housing recess can be made substantially uniform in the axial direction L.

Due to this structure of the sealing resin, when the pressure sensor is heated, the thermal stress applied from the sealing resin to the pressure receiving portion of the sensor unit becomes more uniform. Therefore, the pressure detection of the pressure receiving portion is less affected by the thermal stress.

Thus, according to the pressure sensor of the evaporated fuel leak detector of the exemplar, an error of the pressure detection can be reduced, and the pressure detection accuracy can be improved.

Preferred embodiments of a pressure sensor of an evaporated fuel leak detector will be described with reference to the drawings.

First Embodiment

As shown in FIG. 1, a pressure sensor 1 for an evaporated fuel leak detector (hereinafter, simply referred to as "pressure sensor 1") of the present embodiment is used for an evaporative fuel processing device 6 that includes a fuel tank 61 and a canister 62 configured to adsorb an evaporated fuel discharged from the fuel tank 61. The evaporated fuel leak detector detects an evaporative fuel leak in the device including the fuel tank 61 and the canister 62, by a leak check. In other words, the evaporated fuel leak detector is configured to determine whether or not there is a possibility of a leak of evaporated fuel by using a leak check.

Figure 2:
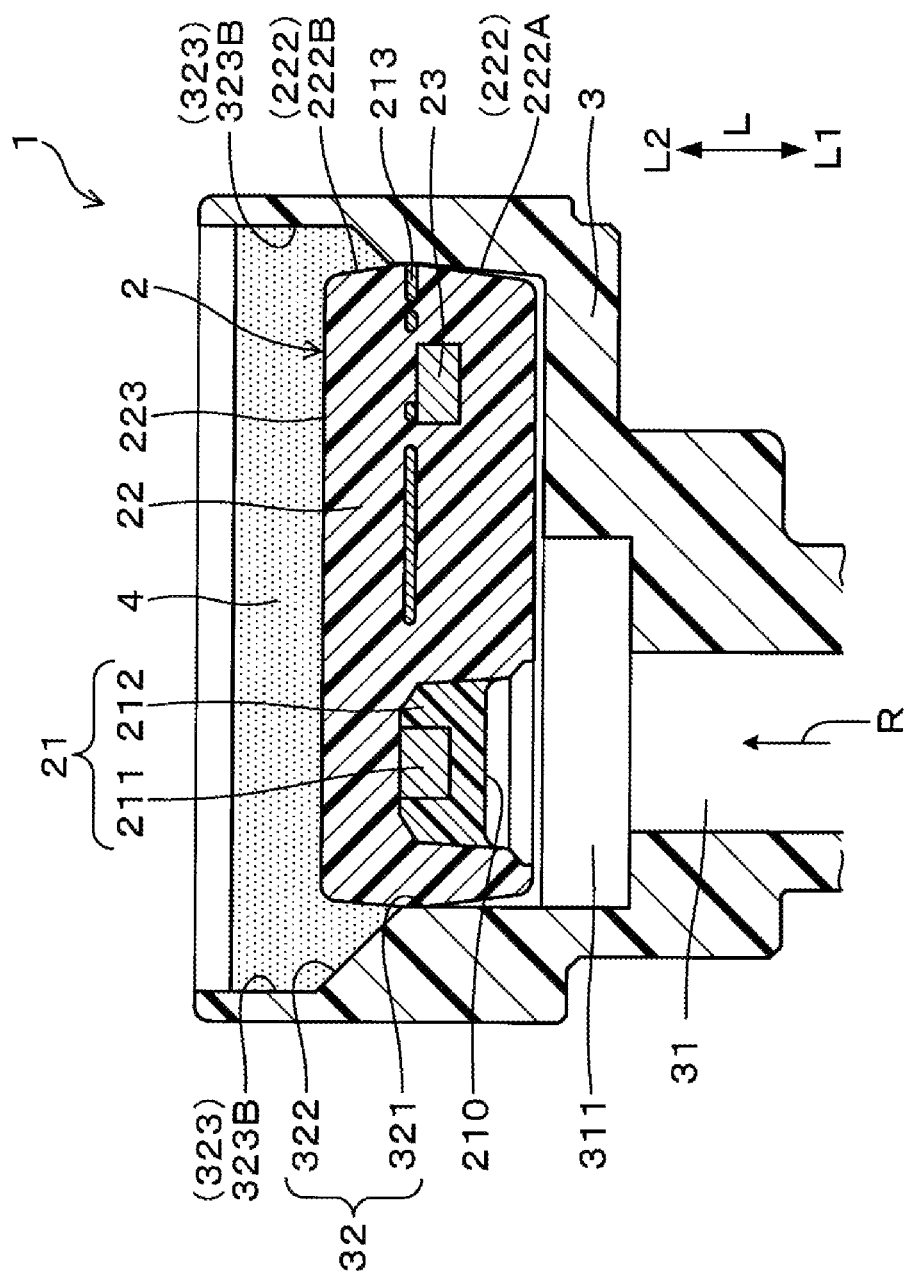
FIG. 2 is a schematic cross-sectional view showing the pressure sensor taken along a cross section II-II of FIG. 4, according to the first embodiment.
Figure 3:
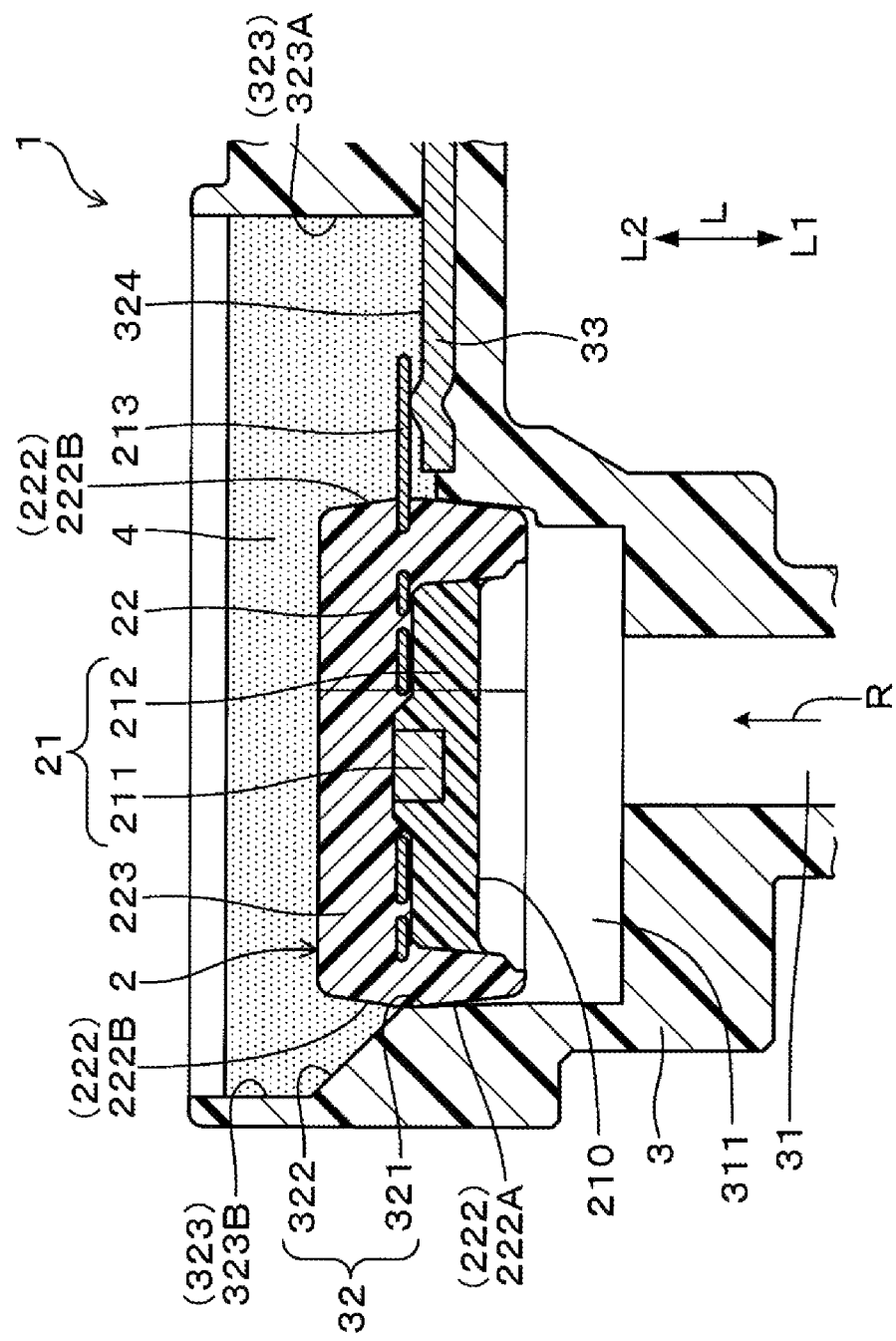
FIG. 3 is a schematic cross-sectional view showing the pressure sensor taken along a cross section III-III of FIG. 4, according to the first embodiment.
Figure 4:
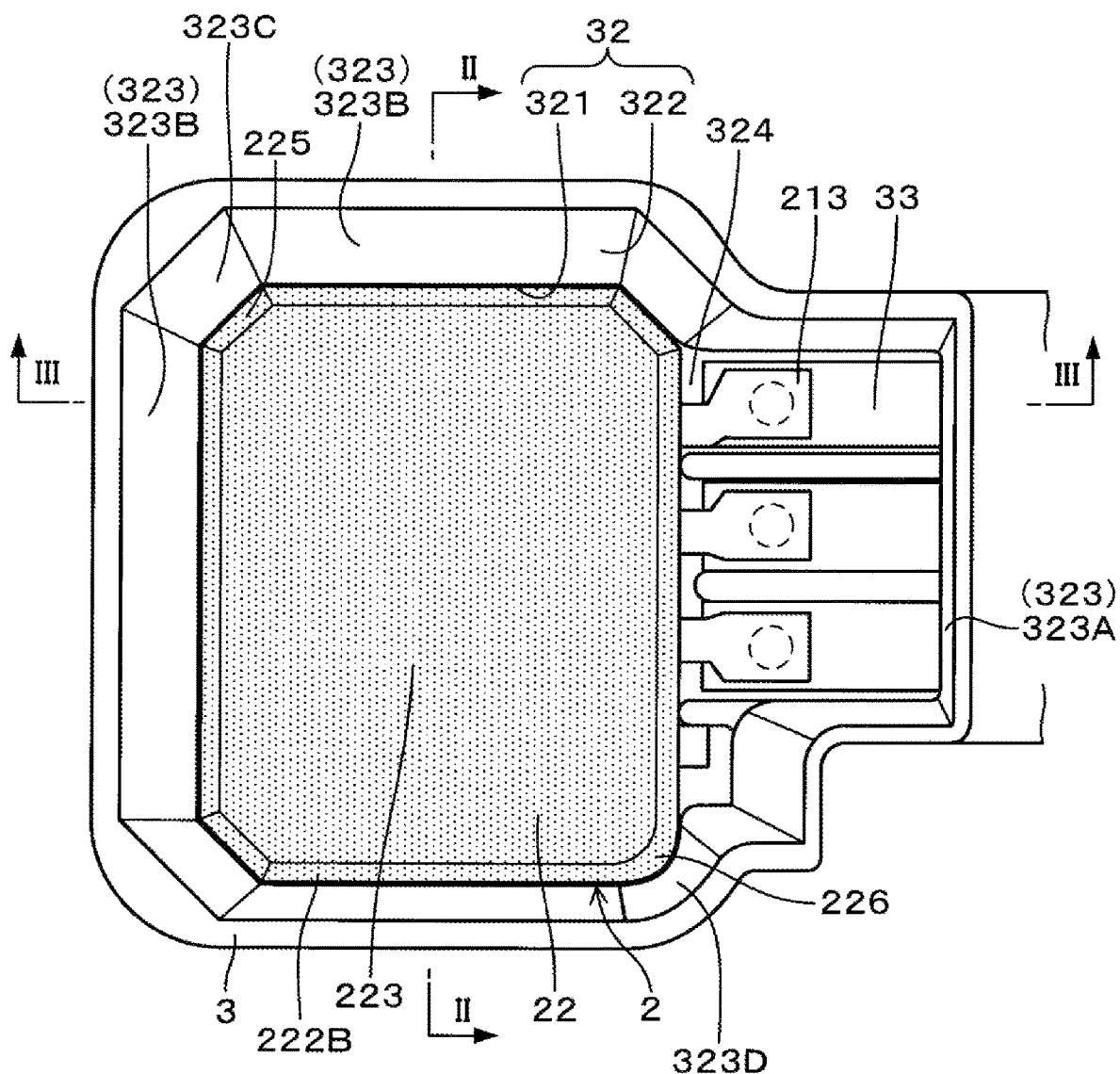
FIG. 4 is a plane diagram showing the pressure sensor according to the first embodiment in a state where a sealing resin is not filled.

As shown in FIGS. 2 to 4, the pressure sensor 1 includes a sensor unit 2, a case 3, and a sealing resin 4. The sensor unit 2 includes a pressure receiving portion 21 for detecting a pressure of a fluid R applied to a pressure receiving surface 210, and a mold resin portion 22 covering a surface of the pressure receiving portion 21 except for the pressure receiving surface 210. The case 3 includes a fluid flow path 31 for introducing a fluid R to the pressure receiving surface 210, and a housing recess 32 connected to the fluid flow path 31. The sensor unit 2 is housed in the housing recess 32 of the case 3. The sealing resin 4 is arranged in the housing recess 32, and is configured to at least cover a back surface 223 of the mold resin portion 22 located on an opposite side of the pressure receiving surface 210.

The pressure sensor 1 of this embodiment will be described in detail below. A decompression leak check module 10 will be now described.

As shown in FIG. 1, the pressure sensor 1 is attached to the vehicle evaporative fuel processing device 6 having the fuel tank 61 and the canister 62, and is a part of the decompression leak check module (ELCM) 10 configured as the evaporated fuel leak detector to check a leak in the fuel tank 61 and the canister 62. The decompression leak check module 10 is provided with: a pressure reducing pump 51 for decompressing the inside of the fuel tank 61 and the inside of the canister 62 to be in a decompression state; a solenoid valve 52 configured to switch a connection of the canister 62 to be connected to an atmosphere pipe 55 opened to the atmosphere or to be connected to the pressure reducing pump 51; and the pressure sensor 1 disposed to detect a pressure within a first pipe 53A. The inside of the first pipe 53A is pressure-reduced by the pressure reducing pump 51.

The pressure reducing pump 51, the solenoid valve 52, the pressure sensor 1, and the like are electrically connected to a controller 8. The pressure sensor 1 is arranged in the first pipe 53A that connects the pressure reducing pump 51 and the solenoid valve 52. The canister 62 and the solenoid valve 52 are connected by a second pipe 53B. A bypass pipe 54 that bypasses the solenoid valve 52 is connected to the first pipe 53A and the second pipe 53B. An orifice 541 is arranged in the bypass pipe 54.

The fuel tank 61 and the canister 62 are connected by a vapor pipe 63 through which the evaporated fuel is discharged. The vapor pipe 63 may be provided with a sealing valve 631 that opens the vapor pipe 63 when the evaporated fuel in the fuel tank 61 is discharged to the canister 62. The canister 62 and an intake pipe 71 of an engine (internal combustion engine) 7 are connected by a purge pipe 64. A purge valve 641 is arranged in the purge pipe 64 to open the purge pipe 64 when the fuel component is discharged from the canister 62 to the intake pipe 71.

The pressure reducing pump 51 is also called as a vacuum pump, and can evacuate the canister 62, the fuel tank 61, the first pipe 53A, the second pipe 53B, and the bypass pipe 54. When the fuel tank 61, the canister 62 and the like are evacuated by the pressure reducing pump 51, the purge valve 641 of the purge pipe 64 is closed.

The solenoid valve 52 is made of an electromagnetic valve. The solenoid valve 52 can be switched between an open position 521 that opens the inside of the canister 62 to the atmosphere and a pressure reducing position 522 that connects the inside of the canister 62 to the pressure reducing pump 51. When the solenoid valve 52 is switched to the pressure reducing position 522, the first pipe 53A and the second pipe 53B communicate with each other via the solenoid valve 52, so that the first pipe 53A, the second pipe 53B and the bypass pipe 54 communicate with each other.

The orifice 541 provided in the bypass pipe 54 is used to simulate a predetermined leak state indicating an upper limit value of a leakage allowable range in the path of evacuation by the pressure reducing pump 51. The orifice 541 of this embodiment simulates a state in which a hole having a diameter of 0.5 mm is formed in the path for evacuation. When a pseudo leakage state is formed by the orifice 541, the solenoid valve 52 is in the open position 521, and a path circulating from the pressure reducing pump 51 through the first pipe 53A, the solenoid valve 52, and the bypass pipe 54 passing through the orifice 541 is vacuumed. Thus, the pressure is detected by the pressure sensor 1. In this state, the pressure detected by the pressure sensor 1 becomes the pressure of a leakage allowable reference value.

On the other hand, when a leakage detection is performed, the solenoid valve 52 is at the pressure reducing position 522, so that the pressure reducing pump 51 evacuates the insides of the fuel tank 61, the canister 62, and the like. At this time, if the pressure detected by the pressure sensor 1 is equal to or less than the leakage allowable reference value, it is determined that there is no leakage, and if the pressure detected by the pressure sensor 1 exceeds the leakage allowable reference value, it is determined that there is leakage.

The solenoid valve 52 is normally located at the open position 521, and the inside of the canister 62 can be kept at atmospheric pressure in a normal state.

Next, an evaporative fuel processing device 6 will be described.

As shown in FIG. 1, in the vehicle, the evaporative fuel processing device 6 is used such that the evaporated fuel, which is part of the gas in the fuel tank 61, is not released into atmosphere. The evaporated fuel in the fuel tank 61 is stored in the canister 62 and then discharged to the intake pipe 71 of the engine 7, or bypasses the canister 62 and is discharged to the intake pipe 71 of the engine 7. Then, the fuel component of the evaporated fuel is used for the combustion in the engine 7.

The flow rate of the combustion air A supplied from the intake pipe 71 to the engine 7 is adjusted by operating the throttle valve 72 arranged in the intake pipe 71. The engine 7 is provided with a fuel injection device (not shown) that injects the fuel F supplied from the fuel tank 61.

Next, the fuel tank 61 will be described.

As shown in FIG. 1, the fuel tank 61 stores the fuel F used for the combustion operation of the engine 7. The fuel tank 61 includes a fuel supply port 611, a vapor port 612, and a fuel pump (not shown). The fuel supply port 611 is used to receive fuel F filled to the fuel tank 61 from outside. The vapor port 612 is connected to the vapor pipe 63. The fuel pump is used when supplying the fuel F to the fuel injection device of the engine 7. The fuel pump supplies the liquid phase fuel F of the fuel tank 61 to the fuel injection device.

A fuel cap 613 is disposed at the fuel supply port 611 of the fuel tank 61, and closes the fuel supply port 611 during a normal operation. The fuel cap 613 is removed during refueling to open the fuel supply port 611. Further, the vehicle is provided with a fuel lid (not shown) that covers the fuel cap 613 during the normal operation. The fuel lid enables the operation of removing/attaching the fuel cap 613 during the refueling.

The canister 62 will be described.

As shown in FIG. 1, the canister 62 includes a canister case 621 and an adsorbent 622 such as activated carbon. The adsorbent 622 is disposed in the canister case 621 and adsorbs the evaporated fuel (i.e., fuel vapor). The canister case 621 of the canister 62 includes an inlet 623, an outlet 624, and a pressure release port 625. The inlet 623 is connected to the vapor pipe 63 and allows gas to enter. The outlet 624 is connected to the purge pipe 64 and allows fuel components to exit. The pressure release port 625 is connected to the second pipe 53B and the solenoid valve 52, so as to be open to the atmosphere. When the evaporated fuel (i.e., gas fuel) is discharged from the gas phase of the fuel tank 61 to the canister 62, and when the solenoid valve 52 is in the open position 521, the pressure release port 625 is opened to the atmosphere through the atmosphere pipe 55. In the canister 62, the fuel components in the evaporated fuel are adsorbed by the adsorbent 622, while the pressure in the canister 62 becomes equal to the atmospheric pressure.

The fuel components adsorbed by the adsorbent 622 of the canister 62 pass through the purge pipe 64 and are discharged to the intake pipe 71 of the engine 7. At this time, the solenoid valve 52 is in the open position 521, the pressure release port 625 of the canister 62 is opened to the atmosphere, and the purge pipe 64 is opened by the purge valve 641. The fuel components adsorbed by the adsorbent 622 are discharged to the intake pipe 71 of the engine 7 by an airflow caused due to the pressure difference between the pressure of the atmosphere entering the canister 62 through the pressure release port 625 and the negative pressure in the intake pipe 71.

Next, the sensor unit 2 of the pressure sensor 1 will be described.

As shown in FIGS. 2 and 3, the pressure receiving portion 21 of the sensor unit 2 is configured by using a piezoresistive semiconductor. The piezoresistive semiconductor utilizes the piezoresistive effect, which is a phenomenon in which electrical resistance changes when a substance is stressed. The pressure receiving portion 21 includes a circuit portion 211 in which a detection circuit such as a Wheatstone bridge is formed, and an insulating gel 212 around the circuit portion 211. A sensor terminal is drawn out from the circuit portion 211 to the outside of the gel 212 and the mold resin.

In the present embodiment, in an axial direction L of the case 3, a side where the pressure receiving surface 210 of the pressure receiving portion 21 is positioned is referred to as the pressure receiving side L1, and a side opposite to the pressure receiving surface 210 is referred to as a back side L2. In other words, the side of the housing recess 32 where the pressure receiving surface 210 of the pressure receiving portion 21 is arranged is referred to as the pressure receiving side L1, and the side of the housing recess 32 opposite to the pressure receiving side L1 is referred to as the back side L2.

The mold resin portion 22 of the sensor unit 2 is made of a thermoplastic resin or the like having an excellent heat resistance. The pressure receiving surface 210 of the pressure receiving portion 21 is formed as a front surface of the pressure receiving portion 21, which is not covered by the mold resin portion 22. The pressure receiving surface 210 is located at a position recessed from a surface of the mold resin portion 22 to the back side L2. The mold resin portion 22 covers a portion of the pressure receiving portion 21 other than the front surface on which the pressure receiving surface 210 is located.

As shown in FIGS. 2 and 3, the mold resin portion 22 of the present embodiment contains a noise removing capacitor 23 configured to remove noise (electromagnetic noise) that affects the pressure detection of the sensor unit 2. The capacitor 23 is made of a monolithic ceramic capacitor or the like in which a plurality of electrodes and dielectrics are laminated. The capacitor 23 has a property of passing an alternating current while blocking a direct current. The capacitor 23 is configured to remove AC component superimposed on the circuit unit 211 by connecting the circuit portion 211 or the like of the pressure receiving portion 21 to the ground. The wirings of the circuit unit 211, the capacitor 23 and the like are electrically connected to a plurality of conduction terminals 213.

Next, the case 3 of the pressure sensor 1 will be described in detail.

As shown in FIGS. 2 and 3, the case 3 of the pressure sensor 1 accommodates the sensor unit 2 and is configured to introduce a fluid R into the pressure receiving portion 21 of the sensor unit 2. The case 3 is arranged in the decompression leak check module 10 that includes the pressure reducing pump 51, the solenoid valve 52 and the like as shown in FIG. 1. The fluid flow path 31 of the case 3 is formed along the axial direction L of the case 3. The axial direction L of the case 3 is a direction perpendicular to the pressure receiving surface 210 of the pressure receiving portion 21 of the sensor unit 2. The pressure of the fluid R flowing through the fluid flow path 31 is applied to the pressure receiving surface 210 of the pressure receiving portion 21 vertically from the fluid flow path 31.

The housing recess 32 of the case 3 is formed in a size that accommodates the sensor unit 2. The housing recess 32 has a fitting portion 321 into which a pressure receiving portion 222A of the mold resin portion 22 of the sensor unit 2 is fitted, and a filling portion 322 connected to the fitting portion 321 to fill with the sealing resin 4. Further, between the fitting portion 321 and the fluid flow path 31, an enlarged flow path portion 311 is formed in which the flow of the fluid R flowing from the fluid flow path 31 to the pressure receiving surface 210 of the pressure receiving portion 21 is enlarged.

The pressure receiving portion 222A positioned on the side surface 222 of the mold resin portion 22, closer to the side where the pressure receiving surface 210 is located, is fitted into the fitting portion 321 of the housing recess 32. Because the mold resin portion 22 of the sensor unit 2 is fitted into the fitting portion 321, the sealing resin 4 is prevented from entering the fluid flow path 31 when the sealing resin 4 is filled in the filling portion 322 of the housing recess 32.

As shown in FIGS. 3 and 4, an inner wall surface 323 defining the filling portion 322 of the housing recess 32 is made of an inner wall surface 323A on a conduction terminal side, and a remaining inner wall surface 323B except for the inner wall surface 323A on the conduction terminal side. The inner wall surface 323A on the conduction terminal side is arranged on one direction of the housing recess 32 in a plane parallel to the pressure receiving surface 210 of the pressure receiving portion 21, and the remaining inner wall surfaces 323B is arranged on the remaining three directions in the plane. At the end of the pressure receiving side L1 of the inner wall surface 323A on the conduction terminal side, a bottom surface 324 parallel to the pressure receiving surface 210 is formed, in a cross section along the axial direction L perpendicular to the pressure receiving surface 210. The bottom surface 324 is located between the side surface 222 of the mold resin portion 22 of the sensor unit 2 and the inner wall surface 323A on the conduction terminal side, as shown in FIG. 3.

The case 3 is provided with a plurality of case-side terminals 33 that come into contact with the plurality of conduction terminals 213 and are conducted. The plurality of conduction terminals 213 of the pressure receiving portion 21 of the sensor unit 2 are electrically connected to a power supply, the controller 8 and the like arranged outside the decompression leak check module 10, via the plurality of case side terminals 33.

As shown in FIG. 4, a chamfered portion 225 or a curved surface portion 226 is formed at four corner portions in a plane parallel to the pressure receiving surface 210 of the pressure receiving portion 21, in the mold resin portion 22 of the sensor unit 2. The inner wall surface 323 of the housing recess 32 of the case 3 is formed in a shape corresponding to the shape of the sensor unit 2 in a plane parallel to the pressure receiving surface 210. A chamfered portion 323C or a curved surface portion 323D is formed at a corner portion of the three remaining inner wall surfaces 323B on the inner wall surface 323 in a plane parallel to the pressure receiving surface 210. The remaining inner wall surface 323B is provided with the chamfered portion 323C and the curved surface portion 323D.

The sealing resin 4 will be described.

As shown in FIGS. 2 and 3, the sealing resin 4 is made of a thermosetting resin such as an epoxy resin. The sealing resin 4 is used for fixing the sensor unit 2 to the case 3 and for sealing the periphery of the sensor unit 2. The sealing resin 4 is filled in the filling portion 322 of the housing recess 32 after the sensor unit 2 is fitted in the fitting portion 321 of the housing recess 32 of the case 3. The sensor unit 2 is covered entirely with the sealing resin 4 filled in the filling portion 322 of the housing recess 32. In other words, when the sensor unit 2 is arranged in the housing recess 32, the mold resin portion 22 of the sensor unit 2 is exposed in the filling portion 322 of the housing recess 32, and then the surface of the mold resin portion 22 is covered and sealed with the sealing resin 4.

The sealing resin 4 is filled in the filling portion 322 of the housing recess 32 so as to cover the entire back surface 223 and the back side portion 222B except for the pressure-receiving side portion 222A, in the side surface 222 of the mold resin portion 22 of the sensor unit 2. With this configuration, it is difficult for electromagnetic noise, heat, etc. generated from the equipment arranged around the pressure sensor 1 to reach the pressure receiving portion 21 of the sensor unit 2.

A material of the pressure sensor 1 will be described.

In a comparative pressure sensor, the back surface of the sensor unit is exposed to the outside without being covered with a sealing resin. In the comparative pressure sensor, there may be two factors that make it difficult to secure airtightness: peeling at the interface between the mold resin portion of the sensor unit and the sealing resin, and peeling at the interface between the case and the sealing resin. Furthermore, because of the two types of interfaces, the peeling may be easily generated.

As shown in FIGS. 2 and 3, in the vicinity of the sensor unit 2 of the pressure sensor 1 of the present embodiment, because the sealing resin 4 covers and seals the entire mold resin portion 22, the interface between the mold resin portion 22 and the sealing resin 4 is not exposed to the outside around the sensor unit 2. In this case, only the interface between the case 3 and the sealing resin 4 is exposed to the outside around the sensor unit 2. As a result, the factor for securing the airtightness of the pressure sensor 1 due to peeling is only the interface between the case 3 and the sealing resin 4.

In the present embodiment, because the capacitor 23 is incorporated into the mold resin portion 22, a resin material having a small linear expansion coefficient is intentionally used in order to approach the linear expansion coefficient of the capacitor 23. Further, the sealing resin 4 of the embodiment is made by adding a filler (filler) as an inorganic material to a curable resin material, in order to intentionally lower the coefficient of linear expansion. In other words, the sealing resin 4 of the present embodiment contains a curable resin material and a filler added to the resin material as an inorganic material. The filler content in the sealing resin 4 is in a range of 40 to 90%.

When the content ratio of the filler in the sealing resin 4 is increased, the coefficient of linear expansion becomes low. For example, when the content of the filler in the sealing resin 4 is 40% by mass or more, the coefficient of linear expansion can be effectively lowered. On the other hand, if the content of the filler in the sealing resin 4 exceeds 90% by mass, the content of the filler becomes too large and the adhesiveness of the sealing resin 4 may deteriorate.

Functions and Effects

The pressure sensor 1 of the evaporated fuel leak detector of this embodiment is used for the decompression leak check module 10. In the pressure sensor 1, the sealing resin 4 arranged in the housing recess 32 covers the back side portion 222B in the side surface 222 of the mold resin portion 22 of the sensor unit 2 and all the back surface 223 of the mold resin portion 22. With this configuration, it is difficult for electromagnetic noises generated from the motor of the pressure reducing pump 51 and the solenoid noise of the solenoid valve 52 arranged around the pressure sensor 1 of the decompression leak check module 10, to reach the sensor unit 2 from the back side L2 of the sensor unit 2. Further, it is possible to prevent heat generated from the motor of the pressure reducing pump 51, the solenoid of the solenoid valve 52, and the like from reaching the sensor unit 2 from the back side L2 of the sensor unit 2. Therefore, the pressure sensor 1 is less susceptible to electromagnetic noise and heat, and the factors that cause a detection error in the pressure sensor 1 can be effectively reduced.

Therefore, according to the pressure sensor 1 of the evaporated fuel leak detector of this embodiment, the pressure detection accuracy can be improved.

Second Embodiment

Figure 5:
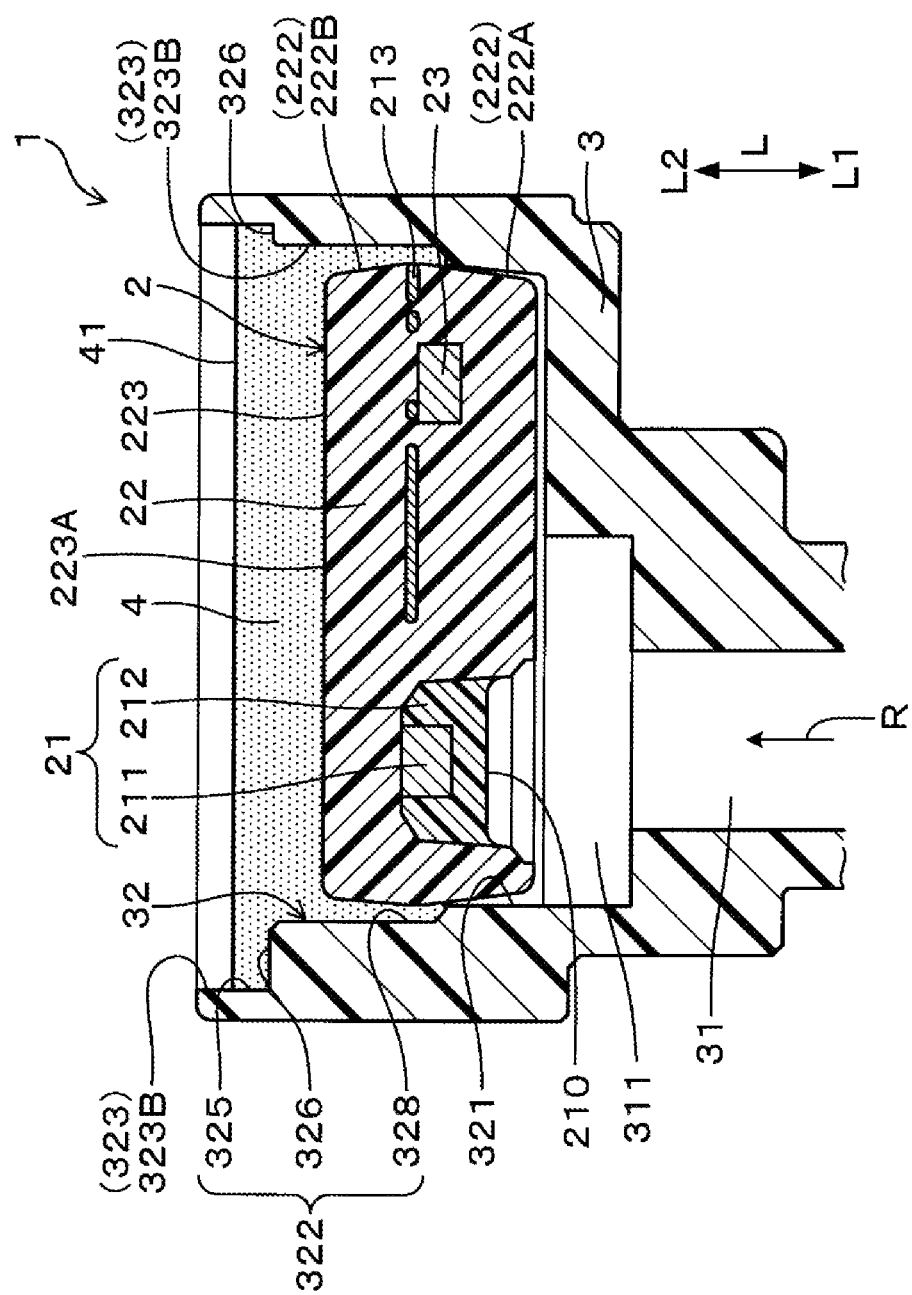
FIG. 5 is a schematic cross-sectional view showing a pressure sensor taken along a cross section V-V of FIG. 7, according to a second embodiment.
Figure 6:
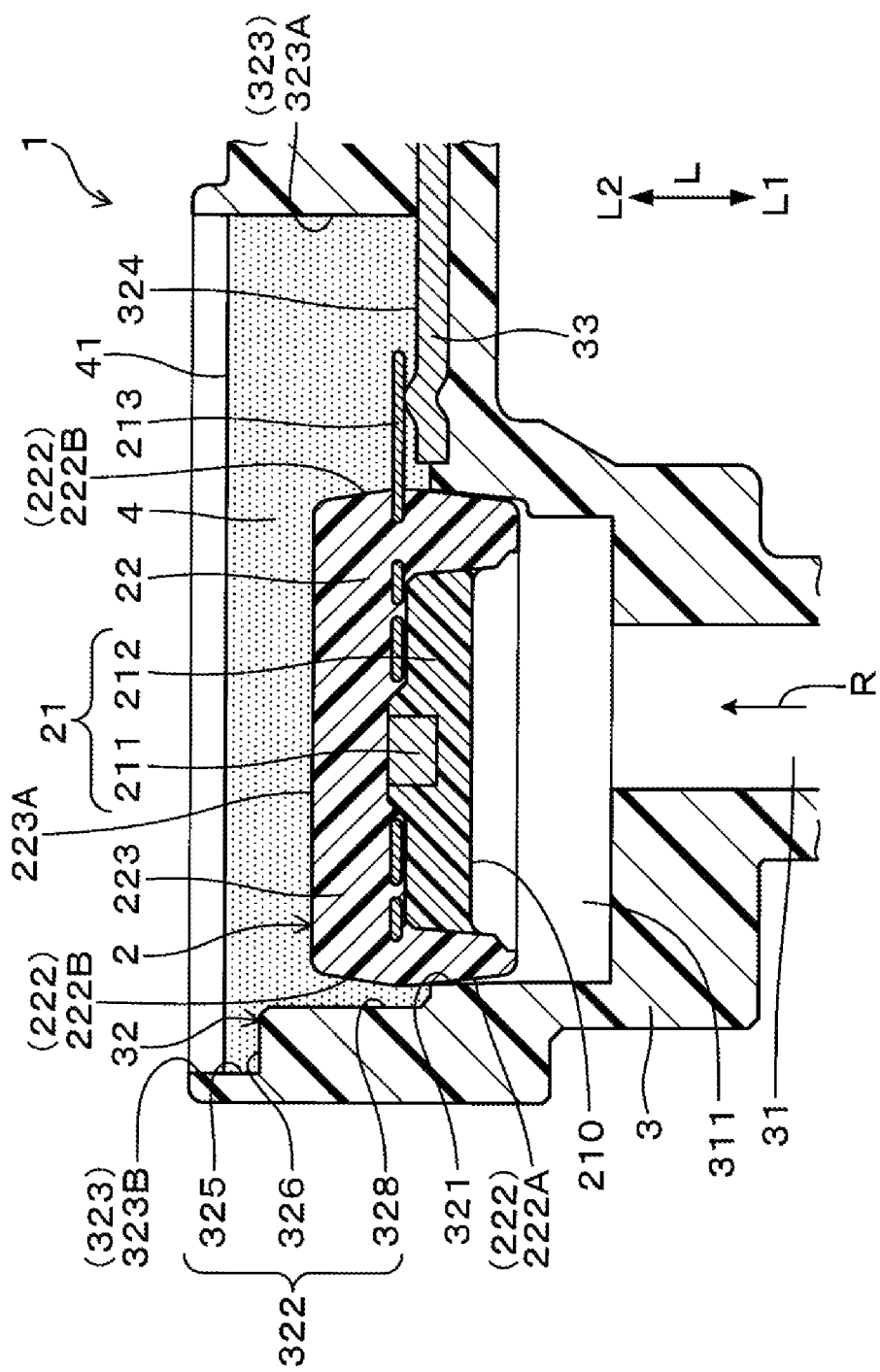
FIG. 6 is a schematic cross-sectional view showing the pressure sensor taken along a cross section VI-VI of FIG. 7, according to the second embodiment.
Figure 7:
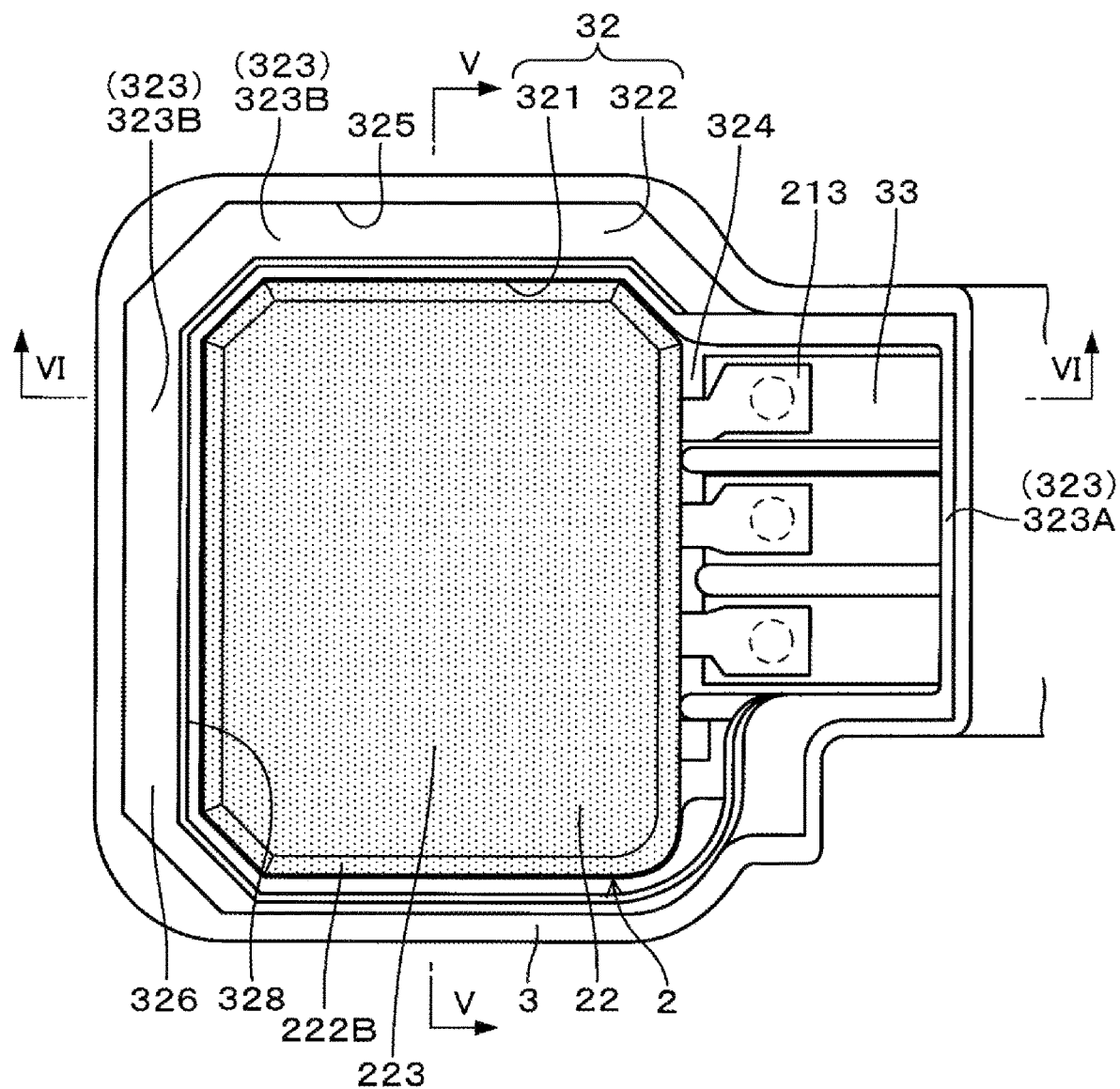
FIG. 7 is a plane diagram showing the pressure sensor according to the second embodiment in a state where a sealing resin is not filled.

A pressure sensor 1 of the present embodiment is different from that of the first embodiment, particularly in the shape of the case 3. As shown in FIGS. 5 to 7, the pressure sensor 1 of the second embodiment also includes a sensor unit 2, a case 3, and a sealing resin 4. The sensor unit 2 includes a pressure receiving portion 21 configured to detect the pressure of the fluid R applied to the pressure receiving surface 210, a plurality of conductive terminals 213 provided at the pressure receiving portion 21 and made of a conductive material, and a mold resin portion 22 that covers the outer surface of the pressure receiving portion 21 except for the pressure receiving surface 210. The basic configurations of the case 3 and the sealing resin 4 are similar to those of the first embodiment, and the explanation of the same portions is omitted partially or entirely.

The annular inner wall surface 323 that surrounds the side surface 222 of the mold resin portion 22 and defines the housing recess 32 is made of the conductive terminal-side inner wall surface 323A and the remaining inner wall surfaces 323B, similarly to the structure of the first embodiment. When the residual inner wall surface 323B is viewed in a cross section along the axial direction L perpendicular to the pressure receiving surface 210, the residual inner wall surface 323B is provided with a parallel stepped surface 326 that is parallel to the pressure receiving surface 210, as shown in FIG. 8.

Figure 8:
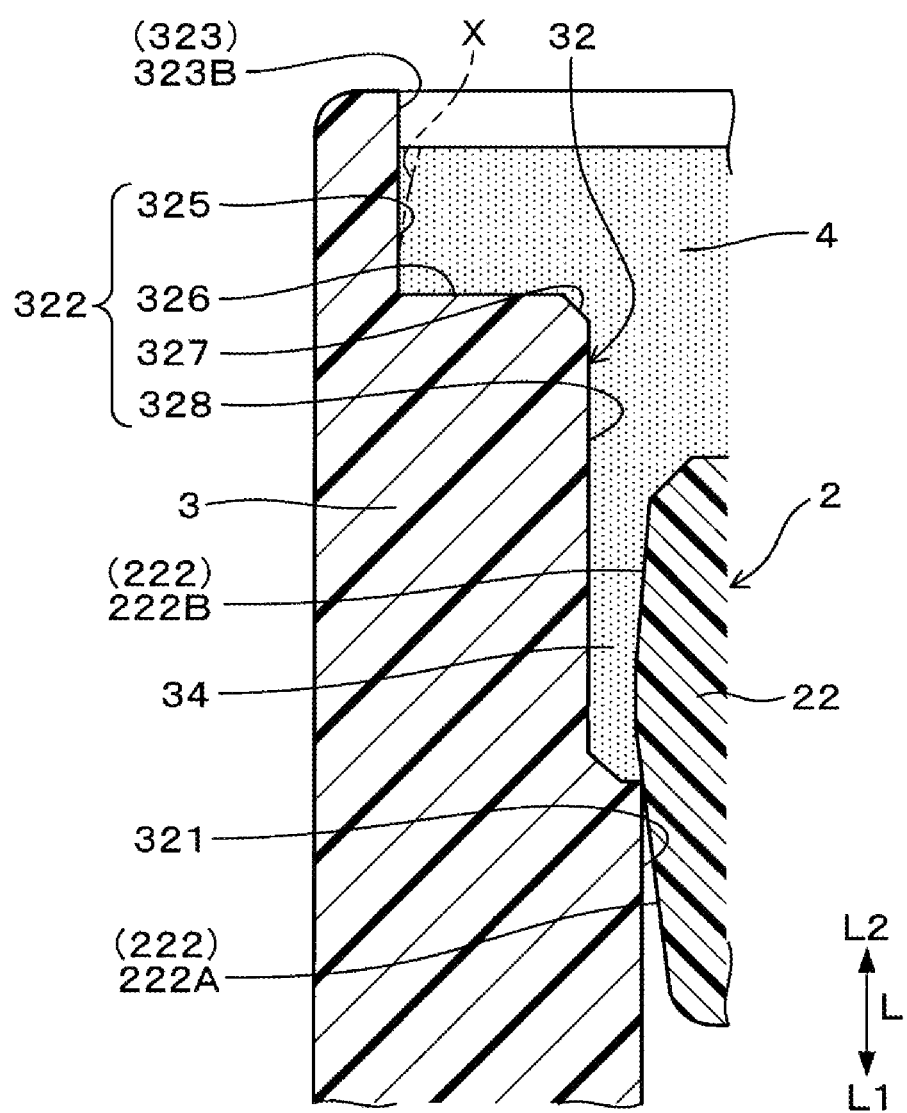
FIG. 8 is an enlarged view showing a part of FIG. 5 according to the second embodiment.

As shown in FIG. 8, the parallel stepped surface 326 is configured to prevent the peeling, which occurs at the exposed position of the back side L2 of the interface between the remaining inner wall surface 323B of the housing recess 32 and the sealing resin 4, from further extending to the pressure receiving side L1. As shown in FIGS. 7 and 8, the parallel stepped surface 326 is formed on the remaining inner wall surfaces 323B arranged on three directions in a plane parallel to the pressure receiving surface 210, among the inner wall surface 323 of the housing recess 32. The parallel stepped surface 326 of each remaining inner wall surface 323B is formed to be parallel to the pressure receiving surface 210.

As shown in FIGS. 5 and 6, all the parallel stepped surface 326 of each remaining inner wall surface 323B is positioned on the back side L2 compared to the tip of the back surface 223 positioned on the back side L2 in the mold resin portion 22. Further, the sealing resin 4 is filled up to a position of the back side L2 more than the parallel stepped surface 326 of each remaining inner wall surface 323B in the housing recess 32. In other words, the surface 41 of the back side L2 of the sealing resin 4 is located on the back side L2 more than the parallel stepped surface 326 of each remaining inner wall surface 323B.

By filling the sealing resin 4 to the position of the back side L2 more than the parallel stepped surface 326, the thickness of the sealing resin 4 arranged on the back side L2 of the mold resin portion 22 can be made equal to or more than a certain thickness. If the parallel stepped surface 326 is used as a mark for the filling position of the sealing resin 4, and the entire parallel stepped surface 326 is buried in the sealing resin 4, the thickness of the sealing resin 4 can be set at a certain thickness or more.

As shown in FIG. 8, in the cross section along the axial direction L perpendicular to the pressure receiving surface 210, the remaining inner wall surface 323B of the present embodiment is provided with a first vertical surface 325, the parallel stepped surface 326, an inclined surface 327 and a second vertical surface 328 in this order from the opening side of the housing recess 32. The opening side of the housing recess 32 corresponds to the back side L2 of the axial direction L. The first vertical surface 325 is located on the most back side L2 of each remaining inner wall surface 323B and is formed perpendicular to the pressure receiving surface 210. The parallel stepped surface 326 is formed adjacent to an end of the pressure receiving side L1 of the first vertical surface 325 in each remaining inner wall surface 323B.

The inclined surface 327 is formed so as to be adjacent to an end of the parallel stepped surface 326 of each remaining inner wall surface 323B and to be positioned inward as toward the pressure receiving side L1, as shown in FIG. 8. The inward means the center side of the housing recess 32 in the plane of the pressure receiving surface 210. The inclined surface 327 serves as a guide surface when the sensor unit 2 is fitted into the fitting portion 321 of the housing recess 32. The inclined surface 327 may be formed in a short range as shown in FIG. 8, or may be formed in a size that appropriately guides the fitting of the sensor unit 2 as shown in FIG. 9.

Figure 9:
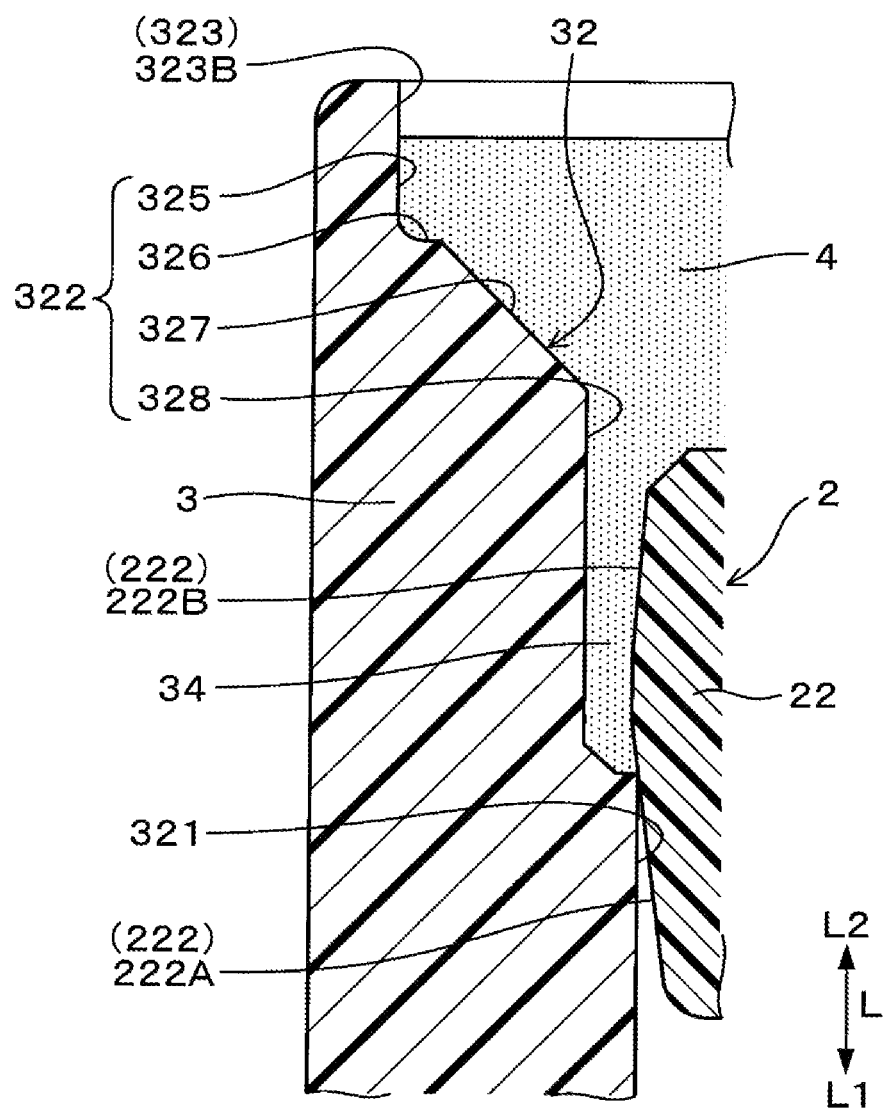
FIG. 9 is an enlarged view showing another pressure sensor according to the second embodiment.

As shown in FIGS. 8 and 9, the second vertical surface 328 is formed perpendicular to the pressure receiving surface 210 adjacent to an end of the pressure receiving side L1 of the inclined surface 327, in each of the remaining inner wall surfaces 323B. The second vertical surface 328 is provided to define a filling gap 34 filled with the sealing resin 4 between the second vertical surface 328 and the side surface 222 of the mold resin portion 22. In other words, the filling gap 34 filled with the sealing resin 4 is formed between the second vertical surface 328 and the side surface 222 of the mold resin portion 22. Further, as shown in FIG. 6, the inner wall surface 323A on the conduction terminal side is formed perpendicular to the pressure receiving surface 210 without a step portion, for example.

Functions and Effects

In the pressure sensor 1 of the evaporated fuel leak detector of the present embodiment, the sealing resin 4 filled in the housing recess 32 covers a surface portion of the mold resin portion 22 arranged in the housing recess 32. That is, the sealing resin 4 covers entirely the back side portion 222B of the side surface 222 of the mold resin portion 22 and the back surface 223 of the mold resin portion 22. With this configuration, in the periphery of the sensor unit 2, the interface between the mold resin portion 22 of the sensor unit 2 and the sealing resin 4 is not exposed to the outside, and only the interface between the case 3 and the sealing resin 4 is exposed to the outside.

The parallel stepped surface 326 is formed on the three remaining inner wall surfaces 323B except for the inner wall surface 323A on the conduction terminal side, which form the housing recess 32 to surround the side surface 222 of the mold resin portion 22 of the sensor unit 2. With this configuration, even if peeling occurs at the interface between the first vertical surface 325 of the remaining inner wall surface 323B of the case 3 and the sealing resin 4 facing the first vertical surface 325, the parallel stepped surface 326 can prevent this peeling from being extended.

In FIG. 8, a case where peeling occurs at the interface between the first vertical surface 325 and the sealing resin 4 is shown by the alternate long and short dash line X. In this case, although the sealing resin 4 is separated from the first vertical surface 325 by peeling, the amount of the sealing resin 4 separated from the first vertical surface 325 becomes smaller as toward the pressure receiving side L1. When the sealing resin 4 tries to separate from the first vertical surface 325 in a direction parallel to the pressure receiving surface 210 of the pressure receiving portion 21 (i.e., the direction perpendicular to the axial direction L), the sealing resin 4 facing the parallel stepped surface 326 is in a state difficult to be separated from the parallel stepped surface 326. As a result, even if peeling occurs between the first vertical surface 325 and the sealing resin 4, the extension of this peeling can be prevented by the parallel stepped surface 326.

Therefore, according to the pressure sensor 1 of the evaporated fuel leak detector of the present embodiment, the spread of peeling at the interface between the first vertical surface 325 and the sealing resin 4 can be prevented, and the airtightness of the pressure sensor 1 can be sufficiently improved.

Next, an inclined stepped surface 326X shown in FIG. 10 will be described.

Figure 10:
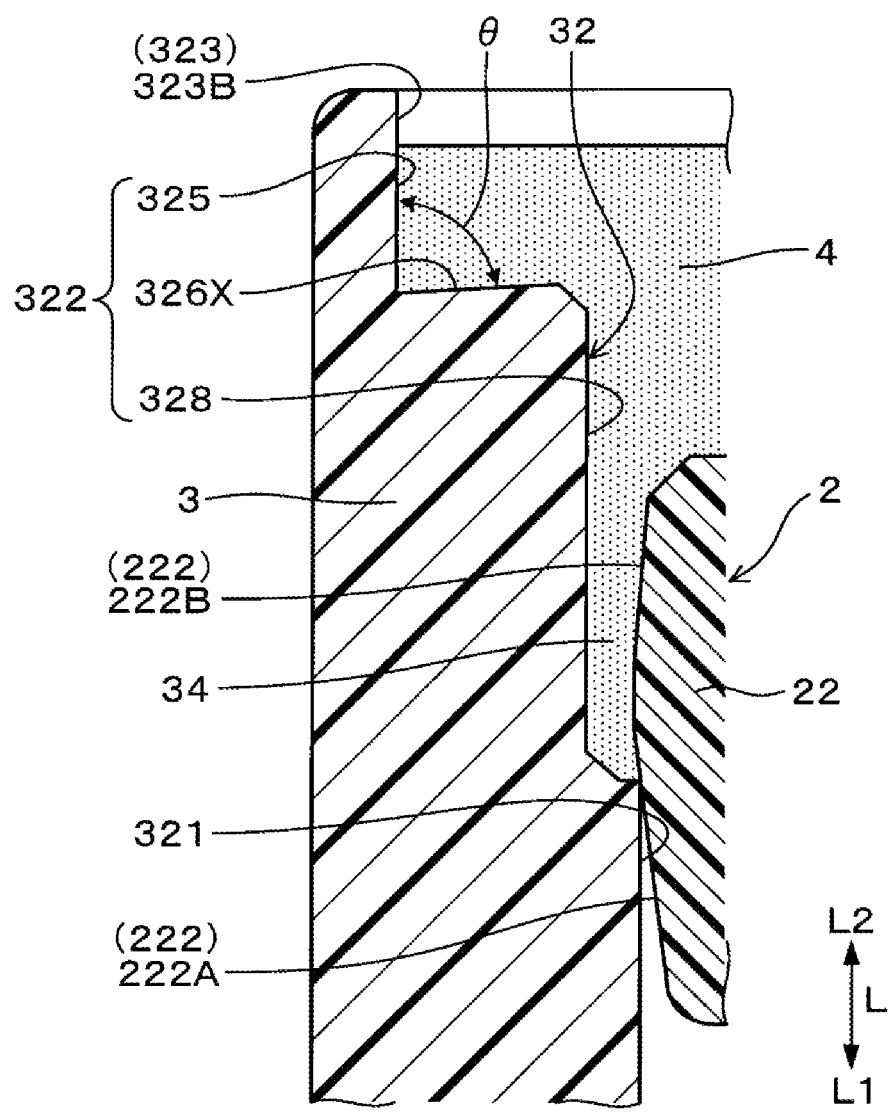
FIG. 10 is an enlarged view showing another pressure sensor according to the second embodiment.

In the example shown in FIG. 10, instead of the parallel stepped surface 326 on each remaining inner wall surface 323B of FIG. 8, an inclined stepped surface 326X having an internal angle θ of less than 90° inclined with respect to the pressure receiving surface 210 may be formed. The internal angle θ is an angle between the first vertical surface 325 and the inclined stepped surface 326X. Because an acute-angled internal angle θ is formed between the first vertical surface 325 and the inclined stepped surface 326X, it can prevent the generated peeling between the first vertical surface 325 and the sealing resin 4 from progressing toward the pressure receiving side L1, as in the parallel stepped surface 326.

In each remaining inner wall surface 323B of the housing recess 32, the inclined surface 327 may not be formed between the first vertical surface 325 and the parallel stepped surface 326. For example, the first vertical surface 325, the parallel stepped surface 326, and the second vertical surface 328 may be formed in this order from the back side L2 of the housing recess 32. Even in this case, the effect of preventing the peeling extension due to the parallel stepped surface 326 can be obtained. Furthermore, the inclined stepped surface 326X may be used instead of the parallel stepped surface 326.

Further, the parallel stepped surface 326 or the inclined stepped surface 326X may be formed in the inner wall surface 323A on the conduction terminal side. Thus, even when peeling occurs at the interface between the inner wall surface 323A on the conduction terminal side and the sealing resin 4, the extension of the peeling can be prevented by the parallel stepped surface 326 or the inclined stepped surface 326X. The parallel stepped surface 326 or the inclined stepped surface 326X may be formed only in a part of the remaining inner wall surface 323B.

Other configurations, functions and effects of the evaporative fuel processing device 1 of the present embodiment are the same as those of the first embodiment. In this embodiment as well, components indicated by the same reference numerals as those in the first embodiment are the same as those in the first embodiment.

Third Embodiment

Figure 11:
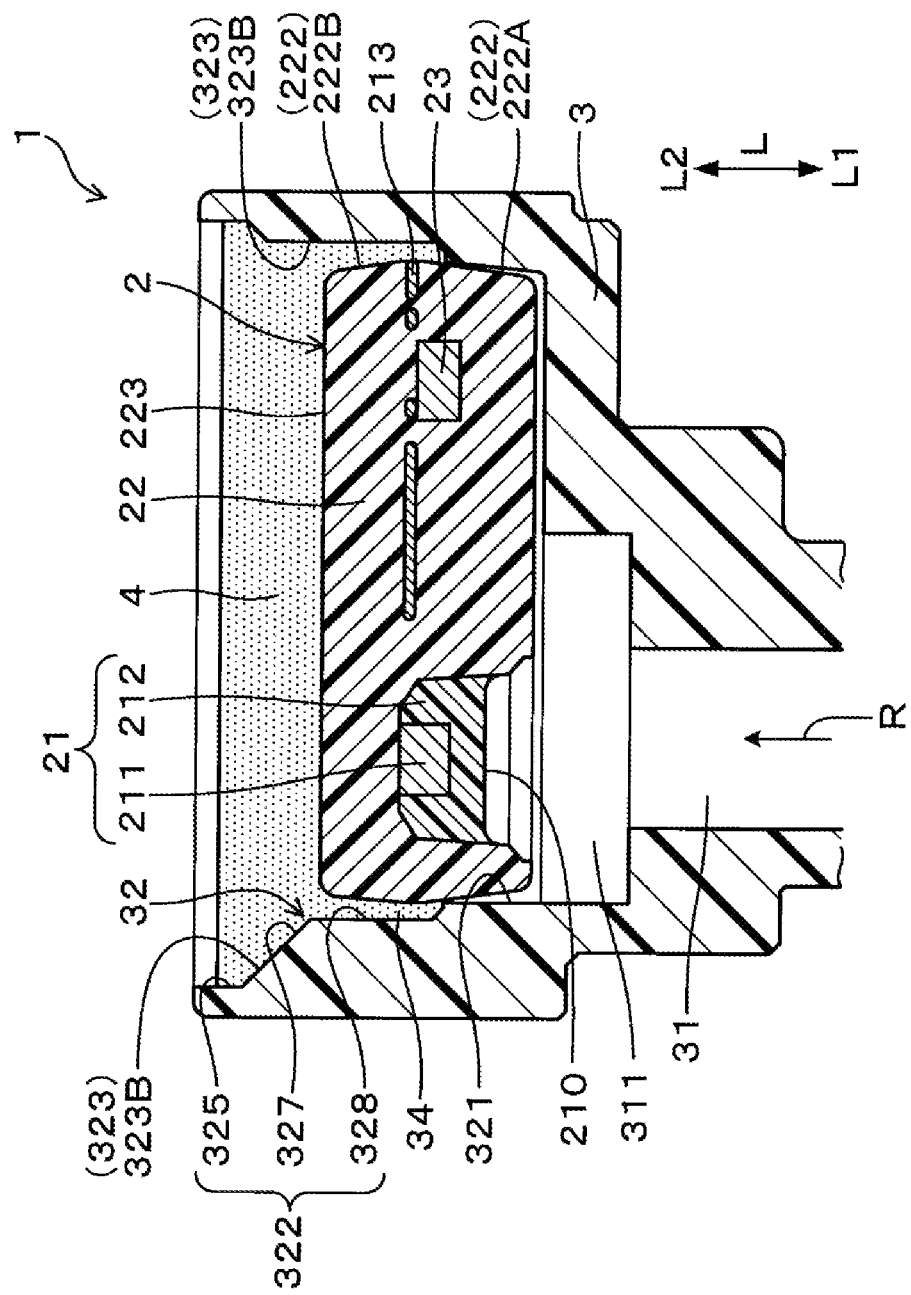
FIG. 11 is a schematic cross-sectional view showing a pressure sensor taken along a cross section XI-XI of FIG. 13, according to a third embodiment.
Figure 12:
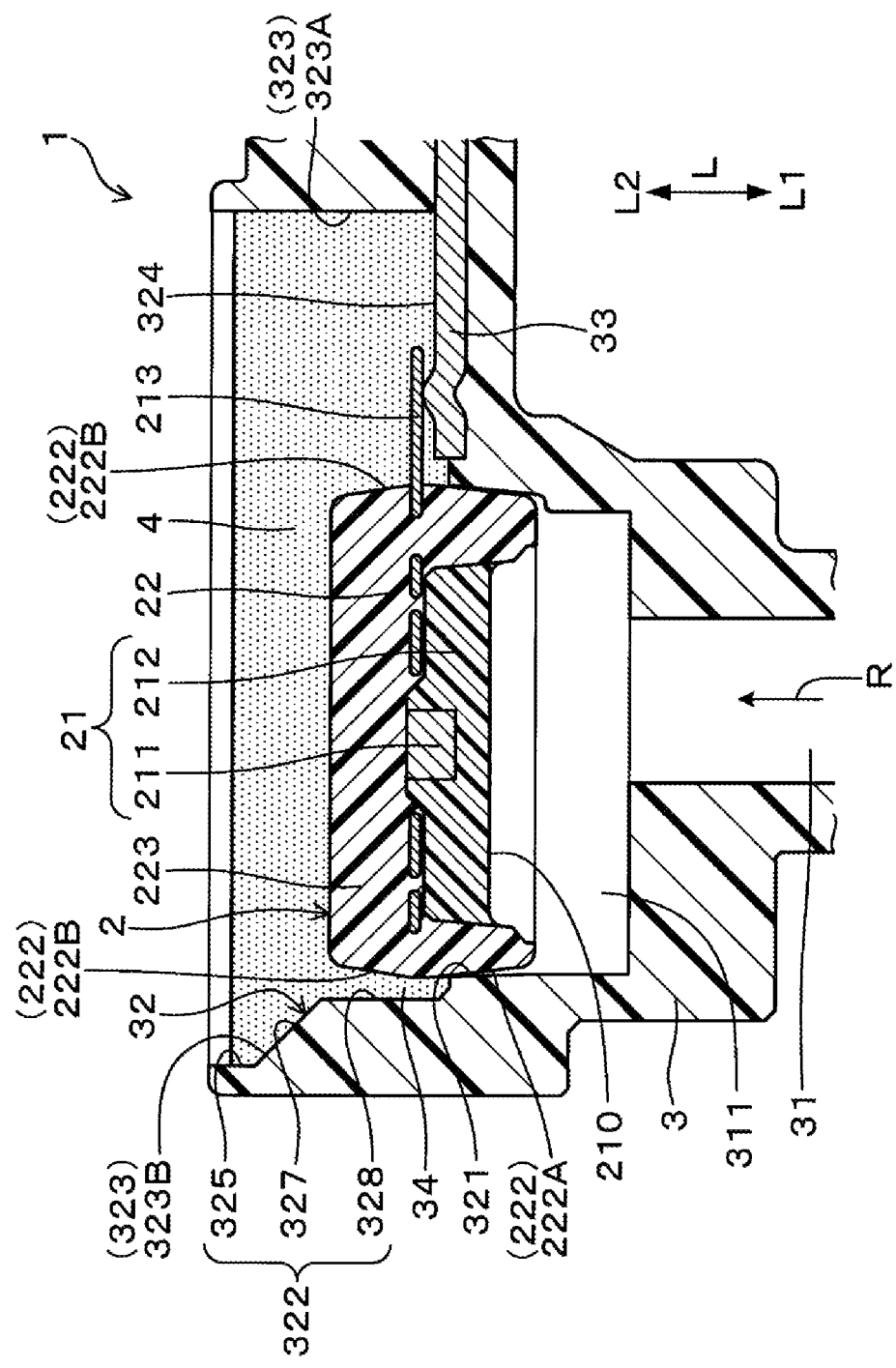
FIG. 12 is a schematic cross-sectional view showing the pressure sensor taken along a cross section XII-XII of FIG. 13, according to the third embodiment.
Figure 13:
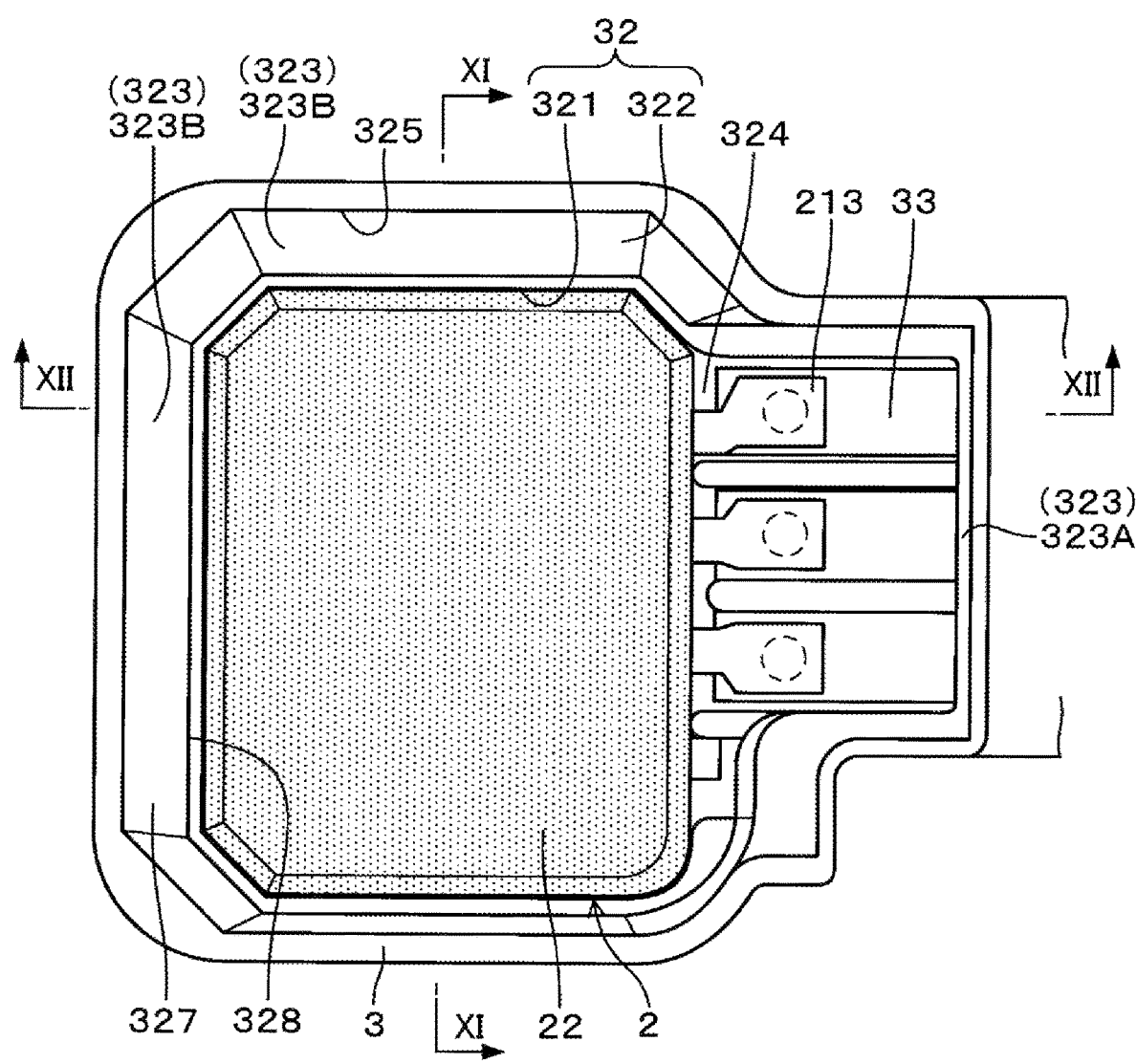
FIG. 13 is a plane diagram showing the pressure sensor according to the third embodiment in a state where a sealing resin is not filled.

A pressure sensor 1 of the third embodiment is different from that of the first or second embodiment, particularly in the shape of the case 3. As shown in FIGS. 11 to 13, the pressure sensor 1 of the third embodiment also includes a sensor unit 2, a case 3, and a sealing resin 4. Each remaining inner wall surface 323B of a housing recess 32 of the present embodiment is provided with a first vertical surface 325, an inclined surface 327 and a second vertical surface 328 in this order, in the cross section along the axial direction L perpendicular to the pressure receiving surface 210. The inclined surface 327 is inclined inward as toward the pressure receiving side L1. The second vertical surface 328 extends from the end the pressure receiving side L1 of the inclined surface 327 to define a filling gap 34 in which the sealing resin 4 is filled between the side surface 222 of the mold resin portion 22 and the second vertical surface 328. The inclined surface 327 and the second vertical surface 328 are formed on a plurality of remaining inner wall surfaces 323B that intersect each other.

The filling gap 34 may be formed to have a regular thickness in a distance of the axial direction L between the pressure receiving side L1 and the back side L2, so that an amount of change in thickness is within a range of, for example, 0.5 mm. Further, the filling gap 34 may be formed within a thickness range of, for example, 0.5 to 2 mm.

Figure 14:
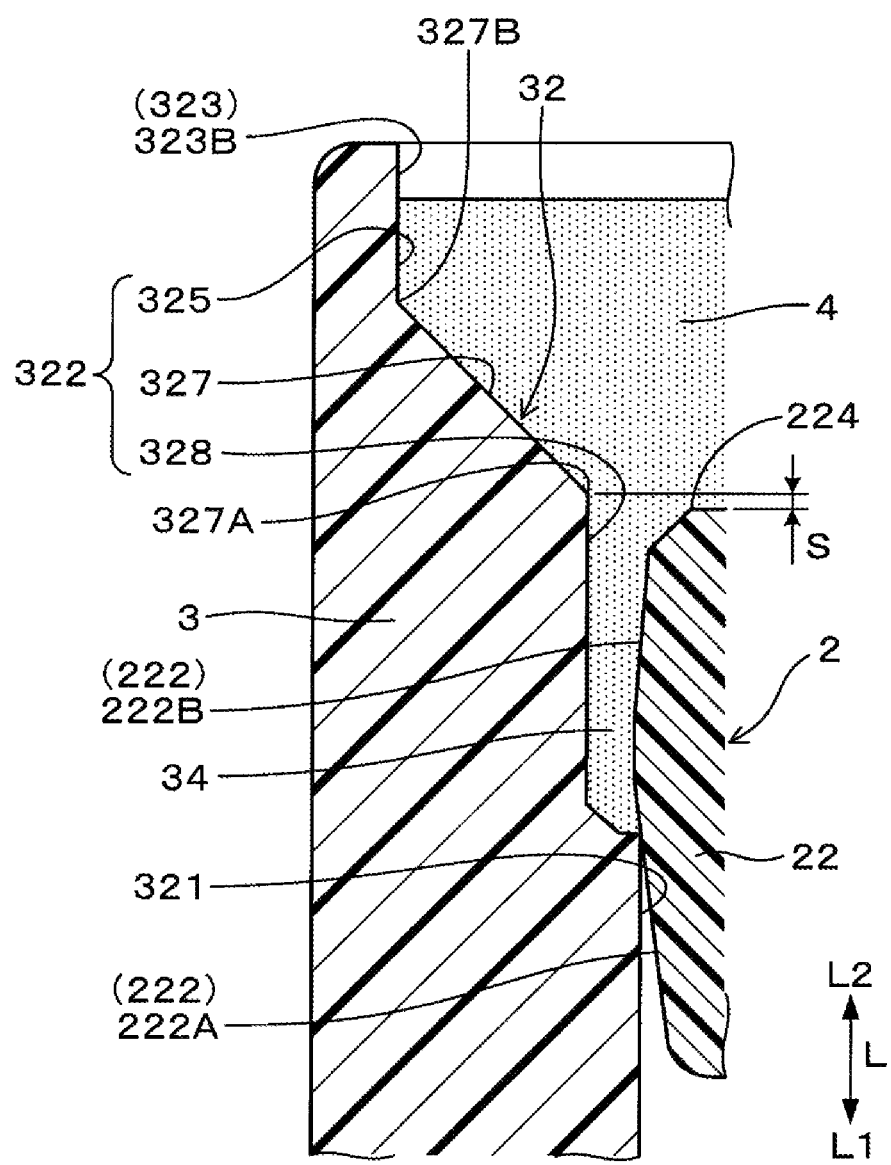
FIG. 14 is an enlarged view showing a part of FIG. 11 according to the third embodiment.

In the present embodiment, as shown in FIG. 14, in the cross section along the axial direction L perpendicular to the pressure receiving surface 210, an end portion 327A of the inclined surface 327 on the pressure receiving side L1 is positioned at the back side L2 of the outer edge portion 224 that is parallel to pressure receiving surface 210 of the mold resin portion 22 in the axial direction L. The difference between the positions of the end portion 327A and the outer edge portion 224 in the axial direction L is indicated by reference numeral S. As a result, when the mold resin portion 22 of the sensor unit 2 is fitted into the fitting portion 321 of the housing recess 32, the mold resin portion 22 is fitted into the fitting portion 321 after being guided to a regular fitting position by the inclined surface 327.

The sealing resin 4 is filled up to the back side L2 more than an end portion 327B on the back side L2 of the inclined surface 327 of each remaining inner wall surface 323B. In other words, the outer surface of the sealing resin 4 is located on the back side L2 more than the end portion 327B on the back side L2 of the inclined surface 327. The entire inclined surface 327 of each remaining inner wall surface 323B is embedded in the sealing resin 4.

Further, as shown in FIGS. 11 and 12, the sealing resin 4 covers the entire back surface 223 of the mold resin portion 22 and the entire back side portion 222B of the side surface 222 of the mold resin portion 22, except for the pressure-receiving side portion 222A in the side surface 222 of the mold resin portion 22. By filling the sealing resin 4 to the position of the back side L2 more than the inclined surface, the thickness of the sealing resin 4 arranged on the back side L2 of the mold resin portion 22 can be made equal to or more than a certain thickness.

As shown in FIG. 14, in the cross section along the axial direction L perpendicular to the pressure receiving surface 210, the remaining inner wall surface 323B of the receiving recess 32 of the present embodiment is provided with the first vertical surface 325, the inclined surface 327 and the second vertical surface 328 in this order from the back side L2 of the receiving recess 32. The configurations of the first vertical surface 325, the inclined surface 327, and the second vertical surface 328 are similar to those of the second embodiment. However, a parallel stepped surface 326 or an inclined stepped surface 326X may be formed between the first vertical surface 325 and the inclined surface 327, as in the example shown in FIGS. 8 to 10.

Functions and Effects

In the pressure sensor 1 of the evaporated fuel leak detector of the present embodiment, the sealing resin 4 filled in the housing recess 32 covers a surface portion of the mold resin portion 22 arranged in the housing recess 32. That is, the sealing resin 4 covers entirely the back side portion 222B of the side surface 222 of the mold resin portion 22 and the back surface 223 of the mold resin portion 22. With this configuration, it is difficult for electromagnetic noises or heat generated from the motor of the pressure reducing pump 51 and the solenoid noise of the solenoid valve 52 arranged around the pressure sensor 1 of the decompression leak check module 10, to reach to the sensor unit 2 from the back side L2 of the sensor unit 2.

Each remaining inner wall surface 323B of the housing recess 32 of the present embodiment is provided with the first vertical surface 325, the inclined surface 327 and the second vertical surface 328 in this order, in the cross section along the axial direction L perpendicular to the pressure receiving surface 210. The inclined surface 327 is inclined inward as toward the pressure receiving side L1. The second vertical surface 328 extends from the end of the pressure receiving side L1 of the inclined surface 327 to define the filling gap 34 in which the sealing resin 4 is filled between the side surface 222 of the mold resin portion 22 and the second vertical surface 328. With this configuration, the thickness of the sealing resin 4 filled in the filling gap 34 between the side surface 222 of the mold resin portion 22 and the second vertical surface 328 is made substantially uniform in the axial direction L between the pressure receiving side L1 and the back side L2.

In FIG. 14, the thickness of the sealing resin 4 filled in the filling gap 34 is slightly changed in the axial direction L due to the tapered shape of the back side portion 222B of the side surface 222 of the mold resin portion 22. However, in this case, the amount of change in the thickness of the sealing resin 4 filled in the filling gap 34 is smaller than the amount of change in the width of the sealing resin 4 due to the inclination angle of the inclined surface 327.

Due to the configuration in which the thickness of the sealing resin 4 filled in the filling gap 34 is substantially uniform, the thermal stress applied to the direction perpendicular to the axial direction L from the sealing resin 4 to the sensor unit 2 is substantially uniform at each portion in the axial direction L when the pressure sensor 1 is heated or cooled.

In this embodiment, the coefficient of linear expansion of the sealing resin 4 is made larger than the coefficient of linear expansion of the mold resin portion 22 of the sensor unit 2. When the pressure sensor 1 is heated, the expansion amount of the sealing resin 4 becomes larger than the expansion amount of the mold resin portion 22, so that thermal stress is applied to the sensor unit 2 including the pressure receiving portion 21 and the mold resin portion 22, from the sealing resin 4 filled in the filling gap 34. At this time, the thermal stress is proportional to the thickness of the sealing resin 4. However, in the present embodiment, by making the thickness of the sealing resin 4 filled in the filling gap 34 substantially uniform, the thermal stress acting on the sensor unit 2 from the sealing resin 4 can be made substantially uniform. In this way, because the thermal stress applied to the sensor unit 2 becomes substantially uniform, it can prevent non-uniform deformation from being generated in the sensor unit 2.

Therefore, according to the pressure sensor 1 of the evaporated fuel leak detector of the present embodiment, the stress acting on the pressure receiving unit 21 due to the deformation of the sensor unit 2 can be reduced, and the pressure detection at the pressure receiving unit 21 can be accurately performed.

Further, the inclined surface 327 and the vertical surface 328 may be formed at least on the two remaining inner wall surfaces 323B perpendicular to each other, so as to effectively guide the sensor unit 2 into the fitting portion 321 of the housing recess 32 using the inclined surface 327. If the two inclined surfaces 327 are provided in the remaining inner wall surface 323B perpendicular to each other, the position of the sensor unit 2 with respect to the fitting portion 321 can be adjusted to be positioned in the plane parallel to the pressure receiving surface 210.

Other configurations, functions and effects of the pressure sensor 1 of the present embodiment are the similar to those of the first or second embodiment. In the above third embodiment, components indicated by the same reference numerals as those in the first or second embodiment may have the same structures as those in the first or second embodiment.

Fourth Embodiment

A pressure sensor 1 of the fourth embodiment is different from that of the first to third embodiments, particularly in the shape of the case 3. As shown in FIGS. 15 to 18, the pressure sensor 1 of the fourth embodiment also includes a sensor unit 2, a case 3, and a sealing resin 4. A buffer recess 35 having an outer shape larger than the outer shape of the pressure receiving surface 210 is formed at the pressure receiving side L1 of the bottom of the housing recess 32 of the present embodiment. The buffer recess 35 is continuously formed at the pressure receiving side L1 of the housing recess 32, and is arranged on the pressure receiving side L1 rather than the sensor unit 2 in a state where the sensor unit 2 is fitted in the fitting portion 321 of the housing recess 32.

Figure 15:
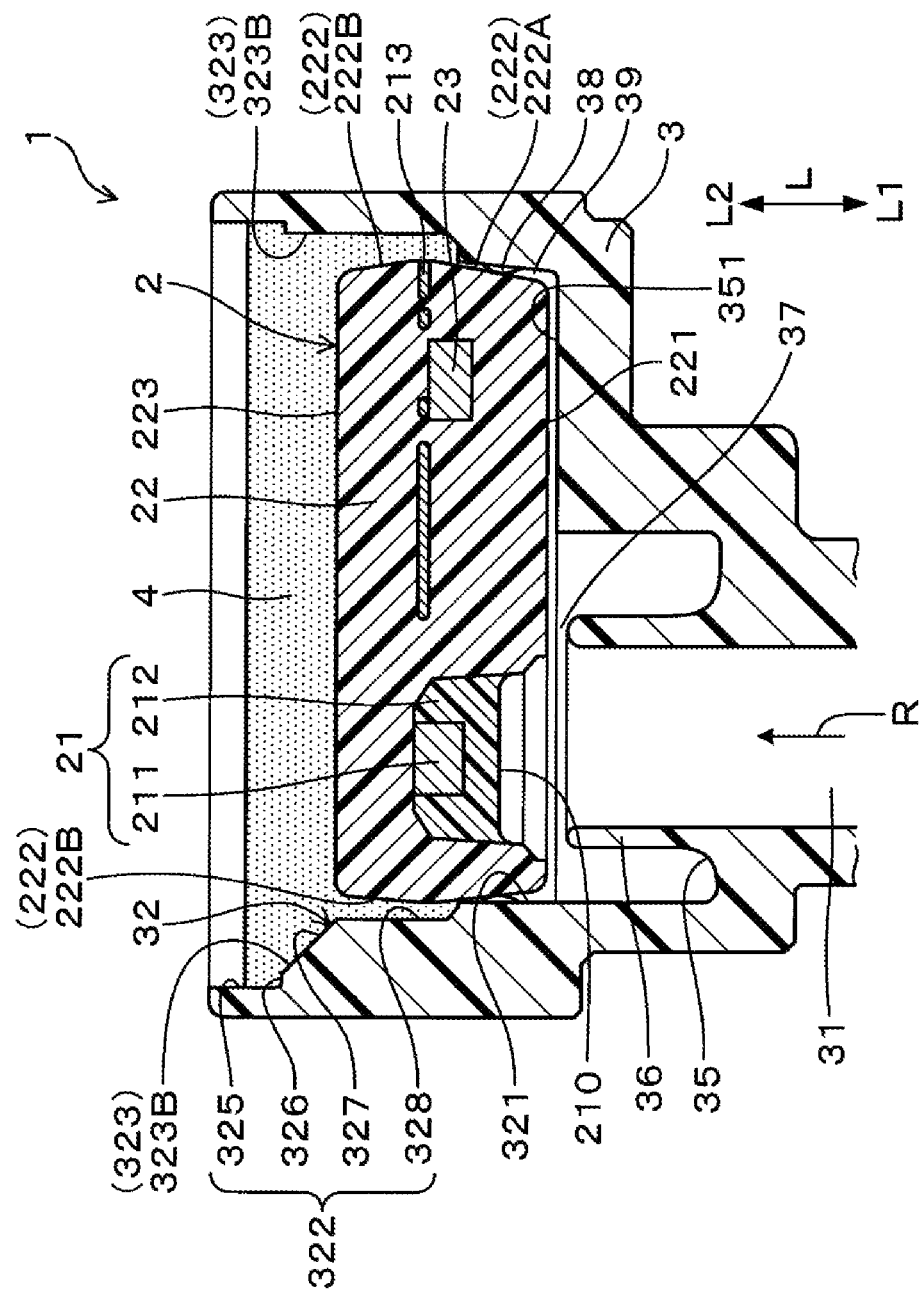
FIG. 15 is a schematic cross-sectional view showing a pressure sensor taken along a cross section XV-XV of FIG. 17, according to a fourth embodiment.
Figure 16:
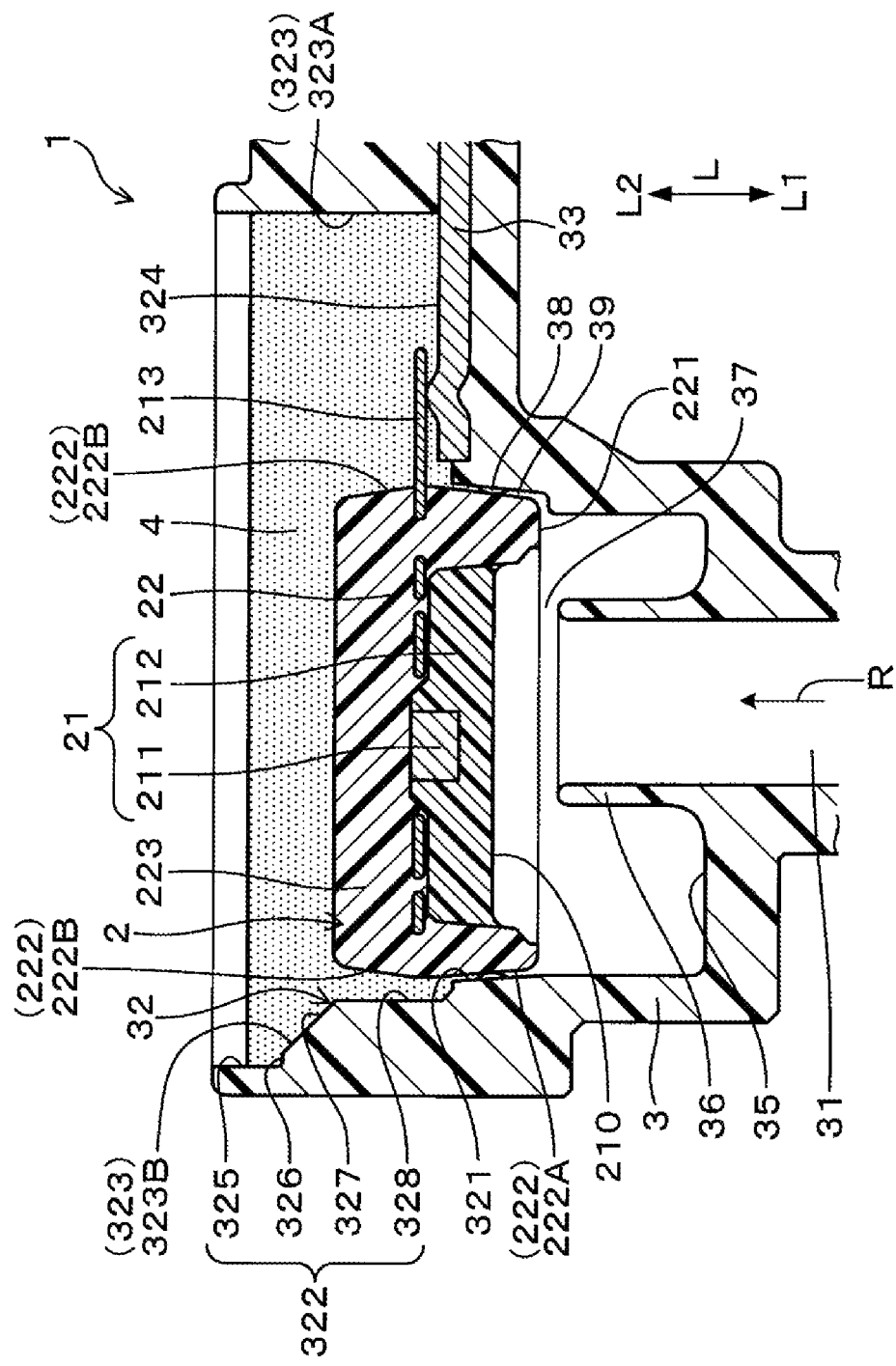
FIG. 16 is a schematic cross-sectional view showing the pressure sensor taken along a cross section XVI-XVI of FIG. 17, according to the fourth embodiment.
Figure 18:
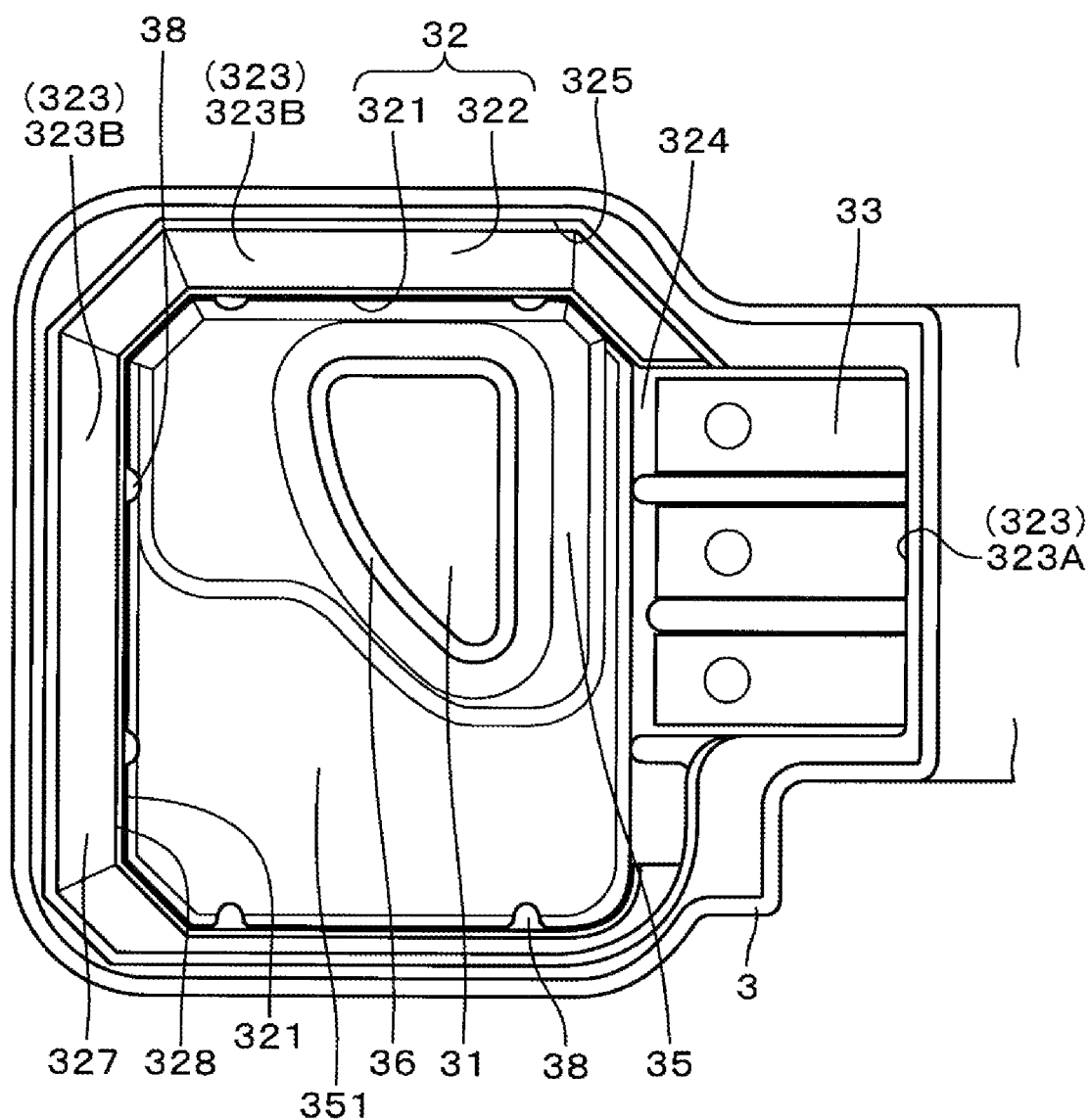
FIG. 18 is a plane diagram showing the pressure sensor according to the fourth embodiment in a state where a sensor unit and a sealing resin are not filled.

As shown in FIGS. 15, 16 and 18, a protruding cylinder portion 36 protruding into the buffer recess 35 toward the back side L2 is formed at an outer edge of an opening end portion of the fluid flow path 31 on the back side L2. The buffer recess 35 is formed in an annular shape around the protruding cylinder portion 36. The housing recess 32 may be deeply formed to be more deeply recessed on the pressure receiving side L1 to have the buffer recess 35 so as to form the protruding cylinder portion 36 on the outer edge of the open end portion of the fluid flow path 31 on the back side L2. The protruding cylinder portion 36 has a tubular shape, and the fluid flow path 31 is formed longer on the back side L2 by the amount of the protruding cylinder portion 36 formed.

As shown in FIGS. 15 and 18, a bottom surface 351 facing the mold resin portion 22 of the sensor unit 2 is formed at a position of the bottom portion of the pressure receiving side L1 of the housing recess 32 where the buffer recess 35 is not formed. The buffer recess 35 can be formed into various shapes around the protruding cylinder portion 36.

As shown in FIGS. 15 and 16, the pressure receiving surface 210 of the pressure receiving portion 21 of the sensor unit 2 is positioned on the back side L2 from the end surface 221 of the pressure receiving side L1 of the mold resin portion 22. Then, the pressure receiving surface 210 of the pressure receiving portion 21 is in a state of being drawn and recessed into the mold resin portion 22 toward the back side L2. Further, the pressure receiving portion 21 is surrounded and protected by the mold resin portion 22.

A fluid passage gap 37 through which the fluid R passes is formed between the end of the back side L2 of the protruding cylinder portion 36 and the end surface 221 of the pressure receiving side L1 of the sensor unit 2. The dimension (i.e., width) of the fluid passage gap 37 in the axial direction L is smaller than the depth from the end surface 221 of the pressure receiving side L1 of the mold resin portion 22 to the bottom surface of the pressure receiving side L1 of the buffer recess 35 due to the formation of the protruding cylinder portion 36.

Figure 17:
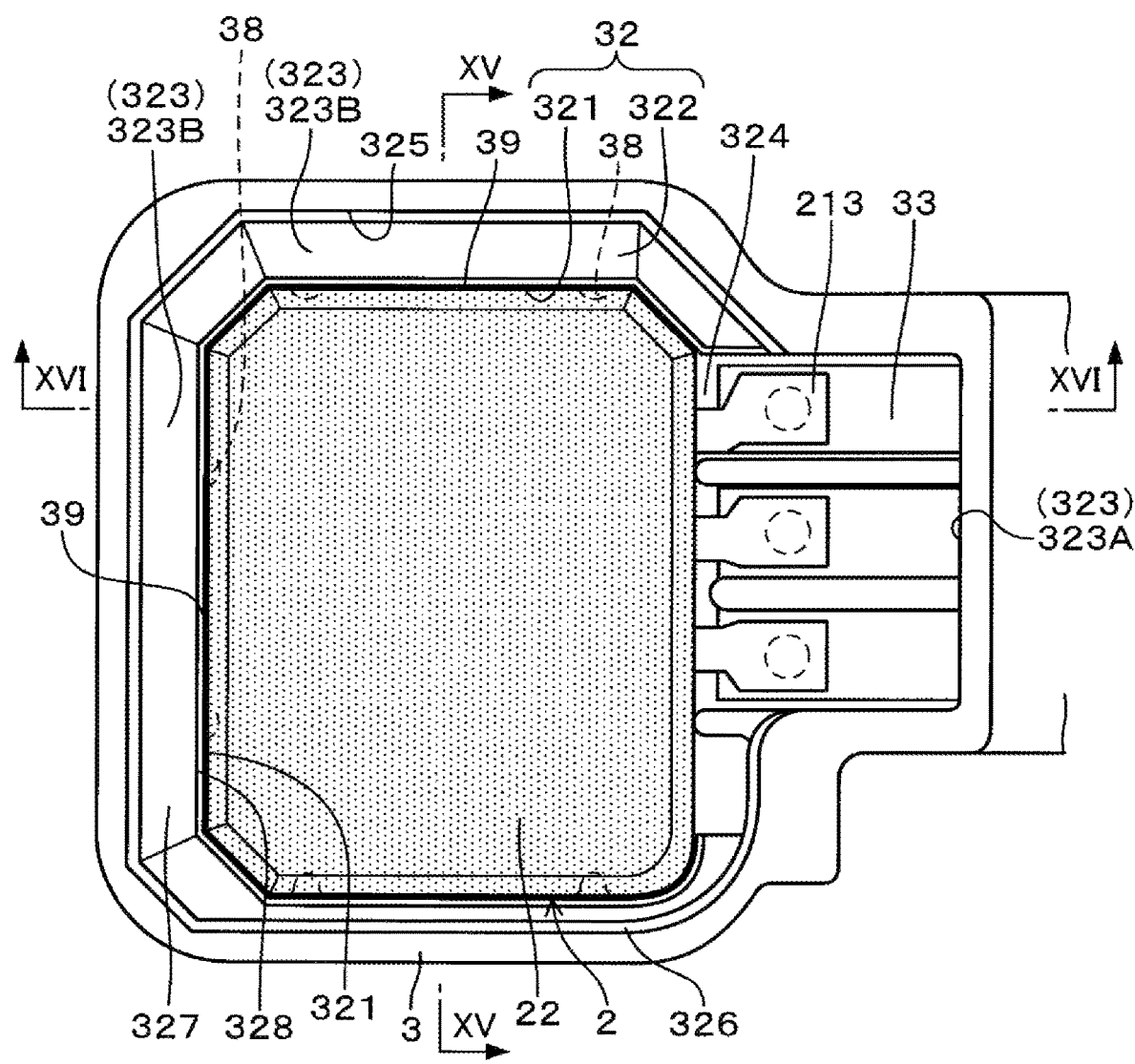
FIG. 17 is a plane diagram showing the pressure sensor according to the fourth embodiment in a state where a sealing resin is not filled.

As shown in FIGS. 15 to 17 of the present embodiment, a fitting gap 39 is provided between the periphery of the end portion of the pressure receiving side L1 of the mold resin portion 22 and the remaining inner wall surfaces 323B of the housing recess 32 on the three-way directions. The pressure-receiving side portion 222A of the mold resin portion 22 is guided by a convex portion 38 formed in the fitting portion 321 of the housing recess 32, and is fitted into the fitting portion 321 of the housing recess 32. It is easy to change the shape of the convex portion 38 by adjusting a shape of a molding die for molding the case 3. Therefore, the size of the fitting gap 39 can be easily adjusted.

Functions and Effects

In the pressure sensor 1 of the evaporated fuel leak detector of this embodiment, a buffer recess 35 is formed at the pressure receiving side L1 of the bottom of the housing recess 32, and is positioned between the housing recess 32 and the fluid flow path 31. Further, the protruding cylinder portion 36 protruding into the buffer recess 35 toward the back side L2 is formed at an outer edge of the opening end portion of the fluid flow path 31 on the back side L2.

When the sealing resin 4 is filled in the housing recess 32 in which the sensor unit 2 is arranged, a part of the sealing resin 4 may flow from the housing recess 32 toward the fluid flow path 31 through the fitting gap 39. Even in this case, a part of the sealing resin 4 is blocked by the protruding cylinder portion 36, and a part of the sealing resin 4 can be stored in the buffer recess 35. As a result, it can prevent a part of the sealing resin 4 from flowing out to the fluid flow path 31.

If a part of the sealing resin 4 flows into the fluid flow path 31, the air flow resistance of the fluid flow path 31 increases, and the responsiveness of detection by the pressure sensor 1 may decrease. Further, in this case, the orifice 541 may be blocked by a part of the sealing resin 4. Thus, the detection accuracy of the leak check of the decompression leak check module 10 may reduce.

In the present embodiment, because the sealing resin 4 can be stored in the buffer recess 35, the detection accuracy of the leak check of the decompression leak check module 10 can be effectively improved. It can prevent the orifice 541 from being blocked by the sealing resin 4 flowing from the receiving recess 32 toward the fluid flow path 31, and it can prevent the sealing resin from adhering to the pressure receiving surface 210 of the pressure receiving portion 21. As a result, the responding ability of the pressure sensor 1 can be improved, and the detection error of the pressure sensor 1 can be effectively prevented. Thus, the detection accuracy of the leak check of the decompression leak check module 10 can be improved. Further, because the sealing resin 4 can be stored in the buffer recess 35, a certain amount of the sealing resin 4 can be allowed to flow out from the housing recess 32 to a side of the fluid flow path 31.

In the present embodiment, because the pressure-receiving side portion 222A in the side surface 222 of the mold resin portion 22 is fitted into the housing recess 32, it is unnecessary to use a concave-convex fitting structure between the mold resin portion 22 and the housing recess 32. As a result, a damage of the mold resin portion 22 can be effectively prevented.

Therefore, according to the pressure sensor 1 of the evaporated fuel leak detector of the present embodiment, the mold resin portion 22 of the sensor unit 2 can be protected, and the pressure can be accurately detected even when the sealing resin 4 flows out from the housing recess 32.

Other configurations, functions and effects of the pressure sensor 1 of the present embodiment are the similar to those of the first to third embodiment. In the above fourth embodiment, components indicated by the same reference numerals as those in the first to third embodiments may have the same structures as those in the first to third embodiments.

In the first to fourth embodiments, a pressure sensor 1 is applied to the decompression leak check module 10. In addition to this, the pressure sensor 1 may be applied to a positive pressure leak check module that performs a leak check in a pressurized state.

The present embodiment has been described above with reference to the specific examples. However, the present disclosure is not limited to these specific examples. Modifications or changes made by a person skilled in the art to these specific examples as appropriate are included in the scope of the present disclosure as long as they have the features of the present disclosure. Each element included in the respective specific examples described above and the arrangement, conditions, shape, and the like of these elements are not limited to those exemplified and can be changed as appropriate. The respective elements included in the specific examples described above can be appropriately combined together as long as there occurs no technical contradiction between them.

What is claimed is:

1. A pressure sensor is for an evaporated fuel leak detector configured to detect a leak of an evaporated fuel in an evaporative fuel processing device including a fuel tank and a canister for adsorbing an evaporated fuel discharged from the fuel tank, the pressure sensor comprising:
a sensor unit including a pressure receiving portion configured to detect a pressure of a fluid applied to a pressure receiving surface, a plurality of conductive terminals provided at the pressure receiving portion and made of a conductive material, and a mold resin portion that covers an outer surface of the pressure receiving portion except for the pressure receiving surface;
a case provided with a fluid flow path through which the fluid is introduced to the pressure receiving surface, and a housing recess housing the sensor unit therein and connected to the fluid flow path; and
a sealing resin filled in the housing recess in which the sensor unit is housed, to cover a surface of the mold resin portion arranged in the housing recess, wherein
the case has an annular inner wall surface defining the housing recess and surrounding a side surface of the mold resin portion, and the annular inner wall surface of the case includes a first inner wall surface on a conductive terminal side where a plurality of conductive terminals are arranged and a plurality of second inner wall surfaces intersecting each other, and when a direction of the housing recess where the pressure receiving surface is arranged to expose from the housing recess is a pressure receiving side and a direction opposite to the pressure receiving side of the housing recess is a back side, one of the second inner wall surfaces has an inclined surface inclined inward as toward the pressure receiving side, and a vertical surface adjacent to the pressure receiving side of the inclined surface and extending in a direction perpendicular to the pressure receiving surface to define a gap filled with the sealing resin between the side surface of the mold resin portion and the vertical surface, in a cross section along a direction perpendicular to the pressure receiving surface.

2. The pressure sensor according to claim 1, wherein an end of the inclined surface on the pressure receiving side is positioned to the back side from an outer edge portion of the mold resin portion in a plane parallel to the pressure receiving surface, in the cross section along the direction perpendicular to the pressure receiving surface, the side surface of the mold resin portion has a pressure-receiving side portion adjacent to the pressure receiving surface, and a back side portion, the pressure-receiving side portion of the side surface of the mold resin portion is fitted into the housing recess, and the sealing resin is filled in the housing recess to a position more than the back side from the inclined surface, to cover all a back surface of the mold resin portion and the back side portion of the mold resin portion except for the pressure-receiving side portion.

3. The pressure sensor according to claim 1, wherein the inclined surface and the vertical surface are provided at least on two second inner wall surfaces perpendicular to each other.

* * * * *